United States Patent
Dugan et al.

(10) Patent No.: US 9,792,612 B2
(45) Date of Patent: Oct. 17, 2017

(54) FACILITATING USER SUPPORT OF ELECTRONIC DEVICES USING DYNAMIC MATRIX CODE GENERATION

(75) Inventors: Michael T. Dugan, Parker, CO (US); Dan J. Minnick, Littleton, CO (US); Mark Gomez, Parker, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 12/953,227

(22) Filed: Nov. 23, 2010

(65) Prior Publication Data

US 2012/0128267 A1    May 24, 2012

(51) Int. Cl.
G06K 19/06    (2006.01)
G06Q 30/00    (2012.01)
H04L 29/08    (2006.01)

(52) U.S. Cl.
CPC .......... *G06Q 30/01* (2013.01); *G06Q 30/016* (2013.01); *H04L 67/36* (2013.01)

(58) Field of Classification Search
USPC .......................................... 235/494; 382/321
See application file for complete search history.

(56) References Cited

U.S. PATENT DOCUMENTS

| | | |
|---|---|---|
| 4,809,325 A | 2/1989 | Hayashi et al. |
| 4,837,414 A | 6/1989 | Edamula |
| 5,500,681 A | 3/1996 | Jones |
| 5,510,603 A | 4/1996 | Hess et al. |
| 5,581,636 A | 12/1996 | Skinger |
| 5,602,377 A | 2/1997 | Beller et al. |
| 5,703,349 A | 12/1997 | Meyerson et al. |
| 5,929,849 A | 7/1999 | Kikinis |
| 5,959,285 A | 9/1999 | Schuessler |

(Continued)

FOREIGN PATENT DOCUMENTS

| | | |
|---|---|---|
| CA | 2 634 951 A1 | 1/2010 |
| CN | 1352765 A | 6/2002 |

(Continued)

OTHER PUBLICATIONS

U.S. Appl. No. 13/037,316, filed Feb. 28, 2011.

(Continued)

*Primary Examiner* — Rafferty Kelly
(74) *Attorney, Agent, or Firm* — Kilpatrick Townsend & Stockton LLP

(57) ABSTRACT

An electronic device may derive information specific to the device, dynamically generate a matrix code that includes the information as well as user support information, and transmit the dynamically generated code to a display. When a user captures the matrix code with a reader device, the reader device may decode (or use a back end server to decode) the specific information specific and the user support information and initiate a user support request. Thus, user support for electronic devices may be facilitated utilizing dynamically generated matrix codes, such as (but not limited to) QR codes. In response to the initiated user support request, user support may then be provided for the user. Problems may be automatically taken care of for the user, tutorials may be provided for the user, one or more notifications may be provided to the user, service calls may be scheduled for the user, and so on.

19 Claims, 10 Drawing Sheets

(56) References Cited

U.S. PATENT DOCUMENTS

| | | | |
|---|---|---|---|
| 5,963,265 A | 10/1999 | Bae et al. | |
| 5,978,855 A | 11/1999 | Metz et al. | |
| 6,006,990 A | 12/1999 | Ye et al. | |
| 6,058,238 A | 5/2000 | Ng | |
| 6,263,502 B1 | 7/2001 | Morrison et al. | |
| 6,438,751 B1 | 8/2002 | Voyticky et al. | |
| 6,512,919 B2 | 1/2003 | Ogasawara | |
| 6,556,273 B1 | 4/2003 | Wheeler et al. | |
| 6,704,929 B1 | 3/2004 | Ozer et al. | |
| 6,766,956 B1 | 7/2004 | Boylan et al. | |
| 6,983,304 B2 | 1/2006 | Sato | |
| 7,046,161 B2 | 5/2006 | Hayes | |
| 7,206,029 B2 | 4/2007 | Cohen-Solal | |
| 7,206,409 B2 | 4/2007 | Antonellis et al. | |
| 7,221,405 B2 | 5/2007 | Basson et al. | |
| 7,244,404 B2 | 7/2007 | Rosenberg et al. | |
| 7,328,848 B2 | 2/2008 | Xia et al. | |
| 7,349,668 B2 | 3/2008 | Ilan et al. | |
| 7,369,180 B2 | 5/2008 | Xing | |
| 7,373,652 B1 | 5/2008 | Bayrakeri et al. | |
| 7,387,250 B2 | 6/2008 | Muni | |
| 7,394,519 B1 | 7/2008 | Mossman et al. | |
| 7,424,976 B2 | 9/2008 | Muramatsu | |
| 7,443,449 B2 | 10/2008 | Momosaki et al. | |
| 7,487,527 B2 | 2/2009 | Ellis et al. | |
| 7,587,601 B2 | 9/2009 | Levy et al. | |
| 7,604,172 B2 | 10/2009 | Onogi | |
| 7,612,748 B2 | 11/2009 | Tateuchi | |
| 7,624,417 B2 | 11/2009 | Dua | |
| 7,624,916 B2 | 12/2009 | Sato et al. | |
| 7,673,297 B1 | 3/2010 | Arsenault et al. | |
| 7,797,430 B2 | 9/2010 | Ichieda | |
| 7,818,675 B2 | 10/2010 | Maruyama et al. | |
| 7,841,531 B2 | 11/2010 | Onogi | |
| 8,010,977 B2 | 8/2011 | Hogyoku | |
| 8,045,054 B2 | 10/2011 | Bishop et al. | |
| 8,186,572 B2 | 5/2012 | Herzig | |
| 8,292,166 B2 | 10/2012 | Gomez et al. | |
| 8,364,018 B2 | 1/2013 | McArdle | |
| 8,380,993 B2 | 2/2013 | Chen et al. | |
| 8,386,339 B2 | 2/2013 | Minnick et al. | |
| 8,408,466 B2 | 4/2013 | Gratton | |
| 8,427,455 B2 | 4/2013 | Matsuda | |
| 8,430,302 B2 | 4/2013 | Minnick et al. | |
| 8,439,257 B2 | 5/2013 | Beals et al. | |
| 8,443,407 B2 | 5/2013 | Gaede et al. | |
| 8,468,610 B2 | 6/2013 | Beals et al. | |
| 8,511,540 B2 | 8/2013 | Anguiano | |
| 8,534,540 B2 | 9/2013 | Gratton et al. | |
| 8,550,334 B2 | 10/2013 | Gratton et al. | |
| 8,553,146 B2 | 10/2013 | Kennedy | |
| 8,746,554 B2 | 6/2014 | Gomez et al. | |
| 8,786,410 B2 | 7/2014 | Beals et al. | |
| 8,827,150 B2 | 9/2014 | Gratton et al. | |
| 8,833,640 B2 | 9/2014 | Martch et al. | |
| 8,856,853 B2 | 10/2014 | Casagrande et al. | |
| 8,875,173 B2 | 10/2014 | Kilaru et al. | |
| 8,886,172 B2 | 11/2014 | Gomez | |
| 8,931,031 B2 | 1/2015 | Schaefer | |
| 9,092,830 B2 | 7/2015 | Gomez et al. | |
| 9,148,686 B2 | 9/2015 | Gerhards et al. | |
| 9,280,515 B2 | 3/2016 | Gaede et al. | |
| 9,329,966 B2 | 5/2016 | Dugan et al. | |
| 9,367,669 B2 | 6/2016 | Gratton | |
| 9,596,500 B2 | 3/2017 | Gomez et al. | |
| 2001/0037297 A1 | 11/2001 | McNair | |
| 2001/0052133 A1 | 12/2001 | Pack et al. | |
| 2002/0011521 A1 | 1/2002 | Lahey et al. | |
| 2002/0027612 A1 | 3/2002 | Brill et al. | |
| 2002/0049980 A1 | 4/2002 | Hoang | |
| 2002/0065728 A1 | 5/2002 | Ogasawara | |
| 2002/0112250 A1 | 8/2002 | Koplar et al. | |
| 2002/0195495 A1 | 12/2002 | Melick et al. | |
| 2003/0018711 A1 | 1/2003 | Imanishi | |
| 2003/0050854 A1 | 3/2003 | Showghi et al. | |
| 2003/0077065 A1 | 4/2003 | Scholten et al. | |
| 2003/0112974 A1 | 6/2003 | Levy | |
| 2003/0121978 A1 | 7/2003 | Rubin et al. | |
| 2003/0125092 A1 | 7/2003 | Burnhouse et al. | |
| 2003/0151562 A1 | 8/2003 | Kulas | |
| 2003/0172374 A1 | 9/2003 | Vinson et al. | |
| 2004/0005900 A1 | 1/2004 | Zilliacus | |
| 2004/0019691 A1 | 1/2004 | Daymond et al. | |
| 2004/0026508 A1 | 2/2004 | Nakajima et al. | |
| 2004/0044532 A1 | 3/2004 | Karstens | |
| 2004/0046790 A1 | 3/2004 | Agarwal et al. | |
| 2004/0049672 A1 | 3/2004 | Nollet et al. | |
| 2004/0260850 A1 | 12/2004 | Yu et al. | |
| 2005/0009564 A1 | 1/2005 | Hayaashi et al. | |
| 2005/0011958 A1 | 1/2005 | Fukasawa et al. | |
| 2005/0015800 A1 | 1/2005 | Holcomb | |
| 2005/0015815 A1 | 1/2005 | Shoff et al. | |
| 2005/0055281 A1 | 3/2005 | Williams | |
| 2005/0059339 A1 | 3/2005 | Honda et al. | |
| 2005/0097618 A1 | 5/2005 | Arling et al. | |
| 2005/0107135 A1 | 5/2005 | Deeds et al. | |
| 2005/0125301 A1 | 6/2005 | Muni | |
| 2005/0149967 A1 | 7/2005 | Hanley et al. | |
| 2005/0163483 A1 | 7/2005 | Rassool | |
| 2005/0180804 A1 | 8/2005 | Andrew et al. | |
| 2005/0203854 A1 | 9/2005 | Das | |
| 2005/0258250 A1 | 11/2005 | Melick et al. | |
| 2005/0262548 A1 | 11/2005 | Shimojo et al. | |
| 2005/0264694 A1 | 12/2005 | Ilan et al. | |
| 2006/0064700 A1 | 3/2006 | Ludvig et al. | |
| 2006/0065733 A1 | 3/2006 | Lee et al. | |
| 2006/0071076 A1 | 4/2006 | Tamayama | |
| 2006/0079247 A1 | 4/2006 | Ritter | |
| 2006/0086796 A1 | 4/2006 | Onogi | |
| 2006/0090179 A1 | 4/2006 | Hsu et al. | |
| 2006/0095286 A1 | 5/2006 | Kimura | |
| 2006/0124742 A1 | 6/2006 | Rines et al. | |
| 2006/0174317 A1 | 8/2006 | Onomatsu et al. | |
| 2006/0196950 A1 | 9/2006 | Kiliccote | |
| 2006/0203339 A1 | 9/2006 | Kleinberger et al. | |
| 2006/0208088 A1 | 9/2006 | Sekiguchi | |
| 2006/0265731 A1 | 11/2006 | Matsuda | |
| 2007/0008344 A1 | 1/2007 | Medina | |
| 2007/0011709 A1 | 1/2007 | Katz et al. | |
| 2007/0016934 A1 | 1/2007 | Okada et al. | |
| 2007/0016936 A1 | 1/2007 | Okada et al. | |
| 2007/0017350 A1 | 1/2007 | Uehara | |
| 2007/0019215 A1 | 1/2007 | Yu | |
| 2007/0063050 A1 | 3/2007 | Attia et al. | |
| 2007/0073585 A1 | 3/2007 | Apple et al. | |
| 2007/0143788 A1 | 6/2007 | Abernathy et al. | |
| 2007/0159522 A1 | 7/2007 | Neven | |
| 2007/0174198 A1 | 7/2007 | Kasahara | |
| 2007/0192723 A1 | 8/2007 | Anzelde et al. | |
| 2007/0200335 A1 | 8/2007 | Tuschel | |
| 2007/0205596 A1 | 9/2007 | Mizuno et al. | |
| 2007/0206020 A1 | 9/2007 | Duffield et al. | |
| 2007/0256118 A1 | 11/2007 | Nomura et al. | |
| 2007/0288594 A1 | 12/2007 | Philyaw et al. | |
| 2008/0022323 A1 | 1/2008 | Koo | |
| 2008/0059998 A1 | 3/2008 | McClenny et al. | |
| 2008/0062164 A1 | 3/2008 | Bassi et al. | |
| 2008/0073434 A1 | 3/2008 | Epshteyn et al. | |
| 2008/0077324 A1 | 3/2008 | Hatano et al. | |
| 2008/0082684 A1 | 4/2008 | Gaos et al. | |
| 2008/0092154 A1 | 4/2008 | Hogyoku | |
| 2008/0112615 A1 | 5/2008 | Obrea et al. | |
| 2008/0156879 A1 | 7/2008 | Melick et al. | |
| 2008/0182561 A1 | 7/2008 | Kim et al. | |
| 2008/0189185 A1 | 8/2008 | Matsuo et al. | |
| 2008/0200153 A1 | 8/2008 | Fitzpatrick et al. | |
| 2008/0200160 A1 | 8/2008 | Fitzpatrick et al. | |
| 2008/0201078 A1 | 8/2008 | Fitzpatrick et al. | |
| 2008/0244675 A1 | 10/2008 | Sako et al. | |
| 2008/0263621 A1 | 10/2008 | Austerlitz et al. | |
| 2008/0267537 A1 | 10/2008 | Thuries | |
| 2008/0281624 A1 | 11/2008 | Shibata | |
| 2008/0288460 A1 | 11/2008 | Poniatowski et al. | |
| 2008/0288600 A1 | 11/2008 | Clark | |

(56) References Cited

U.S. PATENT DOCUMENTS

| | | |
|---|---|---|
| 2008/0307348 A1 | 12/2008 | Jones et al. |
| 2009/0029725 A1 | 1/2009 | Kindberg |
| 2009/0031071 A1 | 1/2009 | Chiu |
| 2009/0031373 A1* | 1/2009 | Hogyoku .................. 725/104 |
| 2009/0070699 A1 | 3/2009 | Birkill et al. |
| 2009/0083808 A1 | 3/2009 | Morrison |
| 2009/0088213 A1 | 4/2009 | Rofougaran |
| 2009/0094546 A1 | 4/2009 | Anzelde et al. |
| 2009/0108057 A1 | 4/2009 | Mu et al. |
| 2009/0113334 A1 | 4/2009 | Chakra et al. |
| 2009/0116074 A1 | 5/2009 | Wilsher |
| 2009/0154759 A1 | 6/2009 | Koskinen et al. |
| 2009/0157511 A1 | 6/2009 | Spinnell et al. |
| 2009/0157530 A1 | 6/2009 | Nagamoto et al. |
| 2009/0172780 A1 | 7/2009 | Sukeda et al. |
| 2009/0179852 A1 | 7/2009 | Refai et al. |
| 2009/0180025 A1 | 7/2009 | Dawson |
| 2009/0196456 A1 | 8/2009 | Bisti et al. |
| 2009/0200367 A1 | 8/2009 | Arnouse |
| 2009/0212112 A1 | 8/2009 | Li |
| 2009/0212113 A1 | 8/2009 | Chiu et al. |
| 2009/0234570 A1 | 9/2009 | Sever |
| 2009/0250512 A1 | 10/2009 | Deck et al. |
| 2009/0254954 A1 | 10/2009 | Jeong |
| 2009/0293088 A1 | 11/2009 | Mukerji et al. |
| 2009/0293110 A1 | 11/2009 | Koga |
| 2009/0294538 A1 | 12/2009 | Wihlborg et al. |
| 2009/0300673 A1 | 12/2009 | Bachet et al. |
| 2009/0303036 A1 | 12/2009 | Sahuguet |
| 2009/0307232 A1 | 12/2009 | Hall |
| 2009/0307719 A1 | 12/2009 | Clark et al. |
| 2009/0312105 A1 | 12/2009 | Koplar |
| 2009/0320066 A1 | 12/2009 | Soldan et al. |
| 2010/0001072 A1 | 1/2010 | Onogi |
| 2010/0004984 A1 | 1/2010 | Beyabani |
| 2010/0017457 A1 | 1/2010 | Jumpertz et al. |
| 2010/0020970 A1 | 1/2010 | Liu et al. |
| 2010/0026721 A1 | 2/2010 | Park et al. |
| 2010/0031162 A1 | 2/2010 | Wiser et al. |
| 2010/0036936 A1 | 2/2010 | Cox et al. |
| 2010/0053339 A1 | 3/2010 | Aaron et al. |
| 2010/0081375 A1 | 4/2010 | Rosenblatt et al. |
| 2010/0089996 A1 | 4/2010 | Koplar |
| 2010/0096448 A1 | 4/2010 | Melick et al. |
| 2010/0103018 A1 | 4/2010 | Yoon et al. |
| 2010/0114715 A1 | 5/2010 | Schuster et al. |
| 2010/0129057 A1 | 5/2010 | Kulkarni |
| 2010/0131373 A1 | 5/2010 | Kubasov |
| 2010/0131900 A1 | 5/2010 | Spetalnick |
| 2010/0131970 A1 | 5/2010 | Falcon |
| 2010/0131983 A1 | 5/2010 | Shannon et al. |
| 2010/0138344 A1 | 6/2010 | Wong |
| 2010/0149187 A1 | 6/2010 | Slavin et al. |
| 2010/0154035 A1 | 6/2010 | Damola et al. |
| 2010/0161437 A1 | 6/2010 | Pandey |
| 2010/0163613 A1 | 7/2010 | Bucher et al. |
| 2010/0169935 A1 | 7/2010 | Abbruzzese |
| 2010/0188514 A1 | 7/2010 | Sato et al. |
| 2010/0201894 A1 | 8/2010 | Nakayama et al. |
| 2010/0205628 A1 | 8/2010 | Davis et al. |
| 2010/0217663 A1 | 8/2010 | Ramer et al. |
| 2010/0225653 A1 | 9/2010 | Sao et al. |
| 2010/0261454 A1 | 10/2010 | Shenfield et al. |
| 2010/0262924 A1 | 10/2010 | Kalu |
| 2010/0262992 A1 | 10/2010 | Casagrande |
| 2010/0272193 A1 | 10/2010 | Khan et al. |
| 2010/0272420 A1 | 10/2010 | Soohoo et al. |
| 2010/0275010 A1 | 10/2010 | Ghirardi |
| 2010/0279710 A1 | 11/2010 | Dicke et al. |
| 2010/0295868 A1 | 11/2010 | Zahnert et al. |
| 2010/0301115 A1 | 12/2010 | Berkun |
| 2010/0313231 A1 | 12/2010 | Okamoto et al. |
| 2010/0319041 A1 | 12/2010 | Ellis |
| 2010/0327060 A1 | 12/2010 | Moran et al. |
| 2011/0000958 A1 | 1/2011 | Herzig |
| 2011/0007218 A1 | 1/2011 | Moran et al. |
| 2011/0007630 A1 | 1/2011 | Almhana et al. |
| 2011/0030068 A1 | 2/2011 | Imai |
| 2011/0039573 A1 | 2/2011 | Hardie |
| 2011/0058516 A1 | 3/2011 | Small et al. |
| 2011/0061003 A1 | 3/2011 | Miyazawa et al. |
| 2011/0065451 A1 | 3/2011 | Danado et al. |
| 2011/0087539 A1 | 4/2011 | Rubinstein et al. |
| 2011/0107374 A1 | 5/2011 | Roberts et al. |
| 2011/0107386 A1 | 5/2011 | De Los Reyes et al. |
| 2011/0138408 A1 | 6/2011 | Adimatyam et al. |
| 2011/0208710 A1 | 8/2011 | Lesavich |
| 2011/0258058 A1 | 10/2011 | Carroll et al. |
| 2011/0264527 A1 | 10/2011 | Fitzpatrick et al. |
| 2011/0264530 A1 | 10/2011 | Santangelo et al. |
| 2011/0282727 A1 | 11/2011 | Phan et al. |
| 2011/0296046 A1 | 12/2011 | Arya et al. |
| 2011/0314485 A1 | 12/2011 | Abed |
| 2011/0321114 A1 | 12/2011 | Newell |
| 2012/0075529 A1 | 3/2012 | Wong et al. |
| 2012/0084206 A1 | 4/2012 | Mehew et al. |
| 2012/0096499 A1 | 4/2012 | Dasher et al. |
| 2012/0117232 A1 | 5/2012 | Brown et al. |
| 2012/0127110 A1 | 5/2012 | Amm et al. |
| 2012/0130835 A1 | 5/2012 | Fan et al. |
| 2012/0130851 A1 | 5/2012 | Minnick et al. |
| 2012/0131416 A1 | 5/2012 | Dugan et al. |
| 2012/0137318 A1 | 5/2012 | Kilaru et al. |
| 2012/0138671 A1 | 6/2012 | Gaede et al. |
| 2012/0139826 A1 | 6/2012 | Beals et al. |
| 2012/0139835 A1 | 6/2012 | Morrison et al. |
| 2012/0142322 A1 | 6/2012 | Gomez |
| 2012/0151293 A1 | 6/2012 | Beals |
| 2012/0151524 A1 | 6/2012 | Kilaru et al. |
| 2012/0153015 A1 | 6/2012 | Gomez et al. |
| 2012/0153017 A1 | 6/2012 | Bracalente et al. |
| 2012/0155838 A1 | 6/2012 | Gerhards et al. |
| 2012/0158919 A1 | 6/2012 | Aggarwal et al. |
| 2012/0159563 A1 | 6/2012 | Gomez et al. |
| 2012/0168493 A1 | 7/2012 | Worms |
| 2012/0168510 A1 | 7/2012 | Gratton |
| 2012/0169928 A1 | 7/2012 | Casagrande et al. |
| 2012/0175416 A1 | 7/2012 | Gomez et al. |
| 2012/0181329 A1 | 7/2012 | Gratton et al. |
| 2012/0182320 A1 | 7/2012 | Beals et al. |
| 2012/0188112 A1 | 7/2012 | Beals et al. |
| 2012/0188442 A1 | 7/2012 | Kennedy |
| 2012/0198572 A1 | 8/2012 | Beals et al. |
| 2012/0199643 A1 | 8/2012 | Minnick et al. |
| 2012/0206648 A1 | 8/2012 | Casagrande et al. |
| 2012/0215830 A1 | 8/2012 | Anguiano |
| 2012/0217292 A1 | 8/2012 | Gratton et al. |
| 2012/0217293 A1 | 8/2012 | Martch et al. |
| 2012/0218470 A1 | 8/2012 | Schaefer |
| 2012/0218471 A1 | 8/2012 | Gratton |
| 2012/0222055 A1 | 8/2012 | Schaefer et al. |
| 2012/0222071 A1 | 8/2012 | Gaede et al. |
| 2012/0222081 A1 | 8/2012 | Schaefer et al. |
| 2012/0293327 A1 | 11/2012 | Mountain |
| 2012/0311623 A1 | 12/2012 | Davis et al. |
| 2013/0068838 A1 | 3/2013 | Gomez et al. |
| 2013/0239157 A1 | 9/2013 | Gaede et al. |
| 2014/0046661 A1 | 2/2014 | Bruner |
| 2014/0076963 A1 | 3/2014 | Gratton et al. |
| 2014/0158762 A1 | 6/2014 | Gomez et al. |
| 2016/0066050 A1 | 3/2016 | Gerhards et al. |

FOREIGN PATENT DOCUMENTS

| | | |
|---|---|---|
| CN | 1571503 A | 1/2005 |
| CN | 1636371 A | 7/2005 |
| CN | 1675930 A | 9/2005 |
| CN | 1839398 A | 9/2006 |
| CN | 101 227 581 A | 7/2008 |
| CN | 101253504 A | 8/2008 |
| CN | 101 355 685 A | 1/2009 |
| CN | 101 409 027 A | 4/2009 |
| CN | 101 873 467 A | 10/2010 |
| CN | 101 894 113 A | 11/2010 |

(56) References Cited

FOREIGN PATENT DOCUMENTS

| | | |
|---|---|---|
| CN | 101 895 722 A | 11/2010 |
| DE | 23 36 711 A1 | 2/1975 |
| DE | 10 2007 038 810 A1 | 2/2009 |
| EP | 1 021 035 A1 | 7/2000 |
| EP | 1 383 071 A2 | 1/2004 |
| EP | 1 555 808 A1 | 7/2005 |
| EP | 1 724 695 A1 | 11/2006 |
| EP | 1 757 222 A1 | 2/2007 |
| EP | 1 768 400 A2 | 3/2007 |
| EP | 2 079 051 A1 | 7/2009 |
| EP | 2 131 289 A1 | 12/2009 |
| EP | 2 439 936 A2 | 4/2012 |
| FR | 2 565 748 A1 | 12/1985 |
| GB | 2 044 446 A | 10/1980 |
| GB | 2 165 129 A | 4/1986 |
| GB | 2 311 451 A | 9/1997 |
| GB | 2 325 765 A | 12/1998 |
| GB | 2 471 567 A | 1/2011 |
| IN | 4698/CHENP/2013 A | 6/2016 |
| IN | 7734/CHENP/2013 A | 6/2016 |
| JP | 2002-215768 A | 8/2002 |
| JP | 3929450 | 6/2007 |
| JP | 2007-213548 A | 8/2007 |
| JP | 2008 244556 A | 10/2008 |
| JP | 2009-140204 A | 6/2009 |
| KR | 2004 0087776 A | 10/2004 |
| TW | 299433 | 3/1997 |
| TW | 200915193 A1 | 4/2009 |
| TW | 200926075 A | 6/2009 |
| TW | 201032139 A | 1/2010 |
| TW | 201038061 | 10/2010 |
| TW | 201043039 A1 | 12/2010 |
| WO | 95/27275 A1 | 10/1995 |
| WO | 97/41690 A1 | 11/1997 |
| WO | 01/06593 A2 | 1/2001 |
| WO | 01/18589 A1 | 3/2001 |
| WO | 2004/019442 A2 | 3/2004 |
| WO | 2005/109338 A1 | 11/2005 |
| WO | 2007/009005 A1 | 1/2007 |
| WO | 2009/056897 A1 | 5/2009 |
| WO | 2009/057651 | 5/2009 |
| WO | 2009/116954 A2 | 9/2009 |
| WO | 2009/144536 A1 | 12/2009 |
| WO | 2010/149161 A1 | 12/2010 |
| WO | 2011/009055 A2 | 1/2011 |
| WO | 01/58146 A2 | 8/2011 |

OTHER PUBLICATIONS

U.S. Appl. No. 13/037,333, filed Feb. 28, 2011.
U.S. Appl. No. 13/037,312, filed Feb. 28, 2011.
U.S. Appl. No. 13/037,302, filed Feb. 28, 2011.
U.S. Appl. No. 13/302,717, filed Nov. 22, 2011.
U.S. Appl. No. 13/192,287, filed Jul. 27, 2011.
U.S. Appl. No. 12/961,369, filed Mar. 9, 2012, Non Final Office Action.
U.S. Appl. No. 12/971,349, filed Nov. 10, 2011, Non-Final Office Action.
U.S. Appl. No. 12/971,349, filed Jan. 20, 2012, Final Office Action.
U.S. Appl. No. 12/971,349, filed Jul. 16, 2012, Non-Final Office Action.
U.S. Appl. No. 12/984,385, filed Jul. 12, 2012, Non-Final Office Action.
U.S. Appl. No. 12/986,721, filed Mar. 16, 2012, Non-Final Office Action.
U.S. Appl. No. 12/986,721, filed Jun. 21, 2012, Notice of Allowance.
U.S. Appl. No. 13/020,678, filed Jul. 30, 2012, Non-Final Office Action.
U.S. Appl. No. 13/035,525, filed Jul. 18, 2012, Non-Final Office Action.
U.S. Appl. No. 12/953,273, filed Nov. 23, 2010.
U.S. Appl. No. 12/958,073, filed Dec. 1, 2010.
U.S. Appl. No. 12/960,285, filed Dec. 3, 2010.
U.S. Appl. No. 12/961,369, filed Dec. 6, 2010.
U.S. Appl. No. 12/964,478, filed Dec. 9, 2010.
U.S. Appl. No. 12/965,645, filed Dec. 10, 2010.
U.S. Appl. No. 12/971,349, filed Dec. 17, 2010.
U.S. Appl. No. 12/973,431, filed Dec. 20, 2010.
U.S. Appl. No. 12/981,244, filed Dec. 29, 2010.
U.S. Appl. No. 12/984,385, filed Jan. 4, 2011.
U.S. Appl. No. 12/986,721, filed Jan. 7, 2011.
U.S. Appl. No. 13/006,270, filed Jan. 13, 2011.
U.S. Appl. No. 13/007,317, filed Jan. 14, 2011.
U.S. Appl. No. 13/010,557, filed Jan. 20, 2011.
U.S. Appl. No. 13/014,591, filed Jan. 26, 2011.
U.S. Appl. No. 13/015,382, filed Jan. 27, 2011.
U.S. Appl. No. 13/016,483, filed Jan. 28, 2011.
U.S. Appl. No. 13/020,678, filed Feb. 3, 2011.
U.S. Appl. No. 13/028,030, filed Feb. 15, 2011.
U.S. Appl. No. 13/031,115, filed Feb. 18, 2011.
U.S. Appl. No. 13/034,482, filed Feb. 24, 2011.
U.S. Appl. No. 13/035,525, filed Feb. 25, 2011.
U.S. Appl. No. 13/035,474, filed Feb. 25, 2011.
U.S. Appl. No. 12/961,369, filed Mar. 9, 2012, Non-Final Office Action.
"Android App Reviews & Showcase Just a Tapp Away," Android Tapp, 10 pp. Found online at http://www.androidtapp.com/download-the-weather-channel-android-app-from-your-tv/, Oct. 22, 2010.
"Can Mobile Barcodes Work on TV?," India and Asia Pacific Mobile Industry Reports, Sep. 2009, 4 pp. Found online at http://www.gomonews.com/can-mobile-barcodes-work-on-tv/, Oct. 22, 2010.
"Fox TV Uses QR Codes," 2d Barcode Strategy, Sep. 2010, 6 pp. Found online at http://www.2dbarcodestrategy.com/2010/09/fox-tv-uses-qr-codes.html, Oct. 22, 2010.
"Fox's Fringe Uses QR Code," 2d Barcode Strategy, Oct. 2010, 4 pp. Found on the Internet at http://www.2dbarcodestrategy.com/2010/10/foxs-fringe-uses-qr-code.html, Oct. 22, 2010.
"Mobile Paths: QR Codes Come to TV," Mobile Behavior: An Omnicom Group Company, Sep. 2010, 8 pp. Found online at http://www.mobilebehavior.com/2010/09/27/mobile-paths-qr-codes-come-to-tv, Oct. 22, 2010.
"What Can I Do with the QR Barcode," Search Magnet Local-QR Barcode Technology, 2 pp. Found online at http://www.searchmagnetlocal.com/qr_barcode_technology.html, Oct. 22, 2010.
Kartina Costedio, "Bluefly QR Codes Debut on TV," 2 pp. Found online at http://www.barcode.com/Mobile-Barcode-News/bluefly-qr-codes-debut-on-tv.html, Oct. 22, 2010.
Gao, J. et al., "A 2D Barcode-Based Mobile Payment System," Multimedia and Ubiquitous Engineering, 2009, 10 pp. Found online at http://ieeexplore.ieee.org/Xplore/login.jsp?url=http%3A%2F%2Fieeexplore.ieee.org%2Fie . . . , Oct. 22, 2010.
Smith, Lindsay, "Barcodes Make History on Global TV", 3 pp. Found online at http://www.lindsaysmith.com/worlds-first-mobio-mini-telethon/, Oct. 22, 2010.
Nghee, Seah Y. , "Data Transmission Between PDA and PC Using Wifi for Pocket Barcode Application", Thesis, University Teknologi Malaysia, May 2007, 126 pp. Found online at http://eprints.utm.my/6421/1/SeahYeowNgeeMFKE20007TTT.pdf, Oct. 22, 2010.
Olson, Elizabeth, "Bar Codes Add Detail on Items in TV Ads," New York Times, Sep. 2010, 3 pp. Found online at http:www.nytimes.com/2010/09/27/business/media/27bluefly.html?src=busln, Oct. 22, 2010.
Rekimoto, Jun et al., "Augment-able Reality: Situated Communication Through Physical and Digital Spaces", Sony Computer Science Laboratory, 2002, 8 pp. Found online at Citeseer: 10.1.1.20.34[1].pdf, Oct. 22, 2010.
Silverstein, Barry, "QR Codes and TV Campaigns Connect," ReveNews, Sep. 2010, 5 pp. Found online at http://www.revenews.com/barrysilverstein/qr-codes-and-tv-campaigns-connect/, Oct. 22, 2010.

(56) References Cited

OTHER PUBLICATIONS

Yamanari, Tomofumi et al., "Electronic Invisible Code Display Unit for Group Work on Reminiscence Therapy," Proceedings of the International MultiConference of Engineers and Computer Scientists 2009, vol. I, IMECS 2009, Mar. 2009, 6 pp. Retrieved from Internet: http://citeseerx.ist.psu.edu/viewdoc/download?doi=10.1.1.148.6904&rep1&type=pdf.
Byford, D., "Universal Interactive Device," International Business Machines Corporation, Jun. 1998, 1 page.
International Search Report and Written Opinion of PCT/US11/60094 mailed on Mar. 30, 2012, 7 pages.
International Search Report of PCT/US11/60109 mailed on Feb. 14, 2012, 3 pages.
International Search Report and Written Opinion of PCT/US2011/068161 mailed on Jun. 14, 2012, 19 pages.
International Search Report and Written Opinion of PCT/US2012/021657 mailed on May 23, 2012, 12 pages.
International Search Report and Written Opinion of PCT/US2012/022405 mailed on Apr. 19, 2012, 11 pages.
International Search Report and Written Opinion of PCT/US2012/024923 mailed on May 22, 2012, 12 pages.
International Search Report and Written Opinion of PCT/US2012/024956 mailed on Jun. 11, 2012, 10 pages.
International Search Report and Written Opinion of PCT/US2012/025502 mailed Jun. 8, 2012, 13 pages.
International Search Report and Written Opinion of PCT/US2012/025607 mailed Jun. 8, 2012, 13 pages.
International Search Report and Written Opinion of PCT/US2012/025634 mailed on May 7, 2012, 8 pages.
International Search Report and Written Opinion of PCT/US2012/026373 mailed Jun. 13, 2012, 14 pages.
International Search Report and Written Opinion of PCT/US2012/026722 mailed Jun. 28, 2012, 11 pages.
Schmitz, A., et al., "Ad-Hoc Multi-Displays for Mobile Interactive Applications," 31st Annual Conference of the European Association for Computer Graphics (Eurographics 2010), May 2010, vol. 29, No. 2, 8 pages.
Yang, C., et al., "Embedded Digital Information Integrated by Video-on-Demand System," Proceedings of the Fourth International Conference on Networked Computing and Advanced Information Management, IEEE Computer Society, 2008, 6 pages.
U.S. Appl. No. 12/971,349, filed Dec. 17, 2010, Office Action mailed Jul. 16, 2012, 11 pages.
U.S. Appl. No. 12/984,385, filed Jan. 4, 2011, Office Action mailed Jul. 12, 2012, 16 pages.
U.S. Appl. No. 12/986,721, filed Jan. 7, 2011, Notice of Allowance mailed Jun. 21, 2012, 7 pages.
U.S. Appl. No. 13/020,678, filed Feb. 3, 2011, Office Action mailed Jul. 30, 2012, 15 pages.
U.S. Appl. No. 13/035,525, filed Feb. 25, 2011, Office Action mailed Jul. 18, 2012, 15 pages.
International Search Report and Written Opinion of PCT/US11/59977 mailed on Mar. 19, 2012, 7 pages.
International Search Report and Written Opinion of PCT/US11/60002 mailed on Feb. 15, 2012, 7 pages.
International Search Report and Written Opinion of PCT/US11/60104 mailed on Mar. 29, 2012, 9 pages.
International Search Report and Written Opinion of PCT/US11/60121 mailed on Feb. 14, 2012, 7 pages.
International Search Report and Written Opinion of PCT/US11/61074 mailed on Jan. 6, 2012, 11 pages.
International Search Report and Written Opinion of PCT/US11/61211 mailed on Mar. 29, 2012, 8 pages.
International Search Report and Written Opinion of PCT/US11/61773 mailed on Feb. 21, 2012, 7 pages.
International Search Report and Written Opinion of PCT/US11/61778 mailed on Mar. 2, 2012, 7 pages.
International Search Report and Written Opinion of PCT/US11/63111 mailed on Apr. 4, 2012, 9 pages.
International Search Report and Written Opinion of PCT/US11/64709 mailed on Apr. 10, 2012, 8 pages.
International Search Report and Written Opinion of PCT/US2011/060098 mailed on Mar. 29, 2012, 10 pages.
International Search Report and Written Opinion of PCT/US2011/063308 mailed on Mar. 29, 2012, 10 pages.
International Search Report and Written Opinion of PCT/US2011/068176 mailed on Mar. 29, 2012, 15 pages.
Ngee, S., "Data Transmission Between PDA and PC Using WiFi for Pocket Barcode Application," Thesis, University Teknologi Malaysia, May 2007, 126 pp. Found online at http://eprints.utm.my/6421/1/SeahYeowNgeeMFKE20007TTT.pdf, Oct. 22, 2010.
U.S. Appl. No. 12/961,369, filed Dec. 6, 2010, Office Action mailed Mar. 9, 2012, 17 pages.
U.S. Appl. No. 12/971,349, filed Dec. 17, 2010, Office Action mailed Nov. 10, 2011, 9 pages.
U.S. Appl. No. 12/971,349, filed Dec. 17, 2010, Final Office Action mailed Jan. 20, 2012, 10 pages.
U.S. Appl. No. 12/986,721, filed Jan. 7, 2011, Office Action mailed Mar. 16, 2012, 6 pages.
International Search Report of PCT/US2012/022581 mailed on Oct. 8, 2012, 18 pages.
International Search Report and Written Opinion of PCT/US2012/026624 mailed Aug. 29, 2012, 14 pages.
Extended European Search Report for EP 12152690.9 dated Jun. 19, 2012, 9 pages.
International Search Report and Written Opinion of PCT/US2012/048032, mailed Oct. 16, 2012, 14 pages.
O'Sullivan, "Can Mobile Barcodes Work on TV?," India and Asia Pacific Mobile Industry Reports, Sep. 2009, 4 pp. Found online at http://gomonews.com/can-mobile-barcodes-work-on-tv/, Feb. 5, 2013.
U.S. Appl. No. 12/958,073, filed Dec. 1, 2010, Office Action mailed Aug. 31, 2012, 12 pages.
U.S. Appl. No. 12/958,073, filed Dec. 1, 2010, Notice of Allowance mailed Jan. 17, 2013, 17 pages.
U.S. Appl. No. 12/961,369, filed Dec. 6, 2010, Final Rejection mailed Oct. 30, 2012, 17 pages.
U.S. Appl. No. 12/971,349, filed Dec. 7, 2010, Final Rejection mailed Oct. 24, 2012, 11 pages.
U.S. Appl. No. 12/981,244, filed Dec. 29, 2010, Office Action mailed Dec. 21, 2012, 23 pages.
U.S. Appl. No. 12/984,385, filed Jan. 4, 2011, Notice of Allowance mailed Nov. 28, 2012, 11 pages.
U.S. Appl. No. 13/015,382, filed Jan. 27, 2011, Office Action Mailed Nov. 13, 2012, 7 pages.
U.S. Appl. No. 13/015,382, filed Jan. 27, 2011, Notice of Allowance mailed Feb. 22, 2013, 12 pages.
U.S. Appl. No. 13/016,483, filed Jan. 28, 2011 Office Action mailed Nov. 2, 2012, 18 pages.
U.S. Appl. No. 12/953,273, filed Nov. 23, 2010, Notice of Allowance, mailed Oct. 18, 2012, 11 pages.
U.S. Appl. No. 13/007,317, filed Jan. 14, 2011, Office action mailed Dec. 19, 2012, 29 pages.
U.S. Appl. No. 13/020,678, filed Feb. 3, 2011, Notice of Allowance mailed Jan. 3, 2013, 13 pages.
U.S. Appl. No. 13/028,030, filed Feb. 15, 2011, Office Action mailed Jan. 11, 2013, 14 pages.
U.S. Appl. No. 13/034,482, filed Feb. 24, 2011, Office Action mailed Oct. 19, 2012, 11 pages.
U.S. Appl. No. 13/035,474, filed Feb. 25, 2011, Office Action mailed Oct. 30, 2012, 11 pages.
U.S. Appl. No. 12/960,285, filed Dec. 3, 2010, Final Office Action mailed Dec. 6, 2012, 17 pages.
U.S. Appl. No. 13/035,525, filed Feb. 25, 2011, Final Office Action mailed Jan. 31, 2013, 26 pages.
U.S. Appl. No. 13/037,302, filed Feb. 28, 2011 Office Action mailed Mar. 1, 2013, 20 pages.
U.S. Appl. No. 13/037,312, filed Feb. 28, 2011, Office Action mailed Aug. 15, 2012, 9 pages.
U.S. Appl. No. 13/037,312, filed Feb. 28, 2011, Final Office Action mailed Feb. 28, 2013, 18 pages.

(56) References Cited

OTHER PUBLICATIONS

U.S. Appl. No. 13/1037,316, filed Feb. 28, 2011, Office Action mailed Jan. 30, 2013, 21 pages.
U.S. Appl. No. 13/037,333, filed Feb. 28, 2011 Notice of Allowance mailed Jan. 18, 2013, 27 pages.
U.S. Appl. No. 13/673,480, filed Nov. 9, 2012 Office Action mailed Jan. 16, 2013, 27 pages.
First Examination Report from European Patent Office dated Feb. 4, 2015 for EP 12716751.8, 4 pages.
Office Action dated Nov. 12, 2014 for Mexican Patent Application No. MX/a/2013/009794 is not translated into English, 2 pages.
Office Action dated Jan. 28, 2015 for Mexican Patent Application No. MX/a/2013/006973 is not translated into English, 3 pages.
Office Action from European Patent Office for Application No. 12716728.6 dated Feb. 26, 2015, 4 pages.
European Search Report for EP 11844504 dated Feb. 24, 2015, 10 pages.
U.S. Appl. No. 14/179,336, filed Feb. 12, 2014 Notice of Allowance mailed Feb. 18, 2015, 15 pages.
U.S. Appl. No. 13/035,474, filed Feb. 25, 2011 Non Final Rejection mailed Feb. 17, 2015, 57 pages.
Office Action of the Intellectual Property Office for ROC Patent App. No. 100143194 dated Sep. 23, 2014, 10 pages.
Office Action of the Intellectual Property Office for ROC Patent App. No. 100142978 dated Sep. 23, 2014, 9 pages.
The First Office Action for Mexican Patent Application No. MX/a/2013/007672 is not translated into English. This document is from prosecution of the corresponding foreign matter for which we do not have a translation. Dated Sep. 11, 2014, 2 pages.
U.S. Appl. No. 14/179,336, filed Feb. 12, 2014, Final Office Action mailed Dec. 1, 2014, 30 pages.
U.S. Appl. No. 13/016,483, filed Jan. 28, 2011, Non-Final Office Action mailed Nov. 3, 2014, 33 pages.
U.S. Appl. No. 12/960,285, filed Dec. 3, 2010, Final Office Action mailed Dec. 3, 2014, 19 pages.
U.S. Appl. No. 13/475,794, filed May 18, 2012, Non-Final Office Action mailed Nov. 21, 2014, 33 pages.
U.S. Appl. No. 12/961,369, filed Dec. 6, 2010, Non-Final Office Action mailed Feb. 13, 2014, 21 pages.
U.S. Appl. No. 13/010,557, filed Jan. 20, 2011, Final Rejection mailed Jan. 15, 2014, 17 pages.
U.S. Appl. No. 13/010,557, filed Jan. 20, 2011, Non-Final Rejection mailed Aug. 5, 2013, 17 pages.
U.S. Appl. No. 13/192,287, filed Jul. 27, 2011, Final Office Action mailed Jan. 28, 2014, 18 pages.
U.S. Appl. No. 13/035,474, filed Feb. 25, 2011, Non Final Rejection mailed Mar. 6, 2014, 20 pages.
Extended European Search Report for EP 11842890.3 dated Mar. 26, 2014, 8 pages.
Extended European Search Report for EP 11850819.1 dated Mar. 17, 2014, 5 pages.
Extended European Search Report for EP 11846486 dated Mar. 26, 2014, 5 pages.
Extended European Search Report for EP 11852630 dated Jun. 30, 2014, 7 pages.
International Preliminary Report on Patentability of PCT/US2012/048032 mailed on Apr. 3, 2014, 6 pages.
International Preliminary Report on Patentability of PCT/US2011/063111 mailed Jun. 13, 2013, 8 pages.
Kato et al, "2D barcodes for mobile phones", Mobile Technology, Applications and Systems, 2005 2nd International Conference on Guangzhou, China Nov. 15-17, 2005, Piscataway, NJ, USA, IEEE, Piscataway, NJ, USA, Nov. 15, 2005, pp. 8pp-8, XP031887368, DOI: 10.1109/MTAS.2005.207166; ISBN: 978-981-05-4573-4, 8 pages.
Office Action and Search Report for ROC (Taiwan) Patent Application No. 10014870 dated May 7, 2014, issued in the corresponding foreign application, 9 pages.
Office Action and Search Report for ROC (Taiwan) Patent Application No. 100142966 dated May 27, 2014, 6 pages.
Office Action for European Patent Application No. 12719817.4 dated Jun. 23, 2014, issued in the corresponding foreign application, 5 pages.
U.S. Appl. No. 14/179,336, filed Feb. 12, 2014 Non-Final Office Action mailed May 22, 2014, 14 pages.
U.S. Appl. No. 12/961,369, filed Dec. 6, 2010, Notice of Allowance mailed Jul. 16, 2014, 15 pages.
U.S. Appl. No. 12/981,244, filed Dec. 29, 2010, Notice of Allowance mailed Mar. 25, 2014, 17 pages.
U.S. Appl. No. 12/965,645, filed Dec. 10, 2010, Final Office Action mailed Mar. 18, 2014, 24 pages.
U.S. Appl. No. 12/965,645, filed Dec. 10, 2010, Notice of Allowance mailed Jun. 20, 2014, 35 pages.
U.S. Appl. No. 13/028,030, filed Feb. 15, 2011, Final Office Action mailed Jul. 11, 2014, 43 pages.
U.S. Appl. No. 12/960,285, filed Dec. 3, 2010, Non-Final Office Action mailed Jun. 6, 2014, 19 pages.
U.S. Appl. No. 13/006,270, filed Jan. 13, 2011, Final Office Action mailed May 9, 2014, 41 pages.
U.S. Appl. No. 13/037,312, filed Feb. 28, 2011, Notice of Allowance mailed Jun. 13, 2013, 10 pages.
U.S. Appl. No. 13/968,611, filed Aug. 16, 2013, Notice of Allowance mailed May 2, 2014, 40 pages.
U.S. Appl. No. 13/968,611, filed Aug. 16, 2013, Non-Final Office Action mailed Jan. 17, 2014, 21 pages.
Jung, Eui-Hyun et al., "A Robust Digital Watermarking System Adopting 2D Barcode against Digital Piracy on P2P Network," IJCSNS International Journal of Computer Science and Network Security, vol. 6, No. 10, Oct. 2006, 6 pages.
First Office Action by the Mexican Institute of Industrial Property for Mexican Patent Application No. MX/a/2013/00988 dated Aug. 14, 2014, 3 pages.
International Preliminary Report on Patentability for PCT/US2011/060002 mailed Jun. 6, 2013, 6 pages.
International Preliminary Report of Patentability for PCT/US2011/060094 mailed Jun. 20, 2013, 6 pages.
International Preliminary Report on Patentability for PCT/US2011/060121 mailed Jun. 20, 2013, 6 pages.
International Preliminary Report on Patentability for PCT/US2011/061211 mailed Jul. 4, 2013, 7 pages.
International Preliminary Report on Patentability for PCT/US2011/061773 mailed Jun. 6, 2013, 6 pages.
International Preliminary Report on Patentability for PCT/US2011/061778 mailed Jul. 11, 2013, 6 pages.
International Preliminary Report on Patentability for PCT/US2011/060098 mailed Jun. 13, 2013, 9 pages.
International Preliminary Report on Patentability for PCT/US2011/063308 mailed Jul. 18, 2013, 9 pages.
International Preliminary Report on Patentability for PCT/SU2012/022581 mailed Aug. 8, 2013, 12 pages.
International Preliminary Report on Patentability for PCT/US2012/022405 mailed Aug. 8, 2013, 7 pages.
International Preliminary Report on Patentability for PCT/US2012/024923 mailed Aug. 29, 2013, 8 pages.
International Preliminary Report on Patentability for PCT/US2012/024956 mailed Aug. 29, 2013, 7 pages.
International Preliminary Report on Patentability for PCT/US2012/025607 mailed Sep. 12, 2013, 8 pages.
International Preliminary Report on Patentability for PCT/US2012/025634 mailed Sep. 6, 2013, 5 pages.
International Preliminary Report on Patentability for PCT/US2012/026373 mailed Sep. 12, 2013, 10 pages.
International Preliminary Report on Patentability for PCT/US2012/026624 mailed Sep. 12, 2013, 12 pages.
International Preliminary Report on Patentability for PCT/US2011/060109 mailed Jun. 20, 2013, 7 pages.
Office Action of the Intellectual Property Office for ROC Patent App. No. 101101486 dated Aug. 5, 2014, 4 pages.
The First Office Action for Mexican Patent Application No. MX/a/2013/006262 is not translated into English. This document is from prosecution of the corresponding foreign matter for which we do not have a translation. Dated Aug. 7, 2014, 2 pages.

(56) References Cited

OTHER PUBLICATIONS

Publication of PCT/US2011/059977 by the India Controller General of Patents Designs and Trademarks as India Patent Publication No. 4694/CHENP/2013 A on Sep. 5, 2014, 1 page.
Publication of PCT/US2012/025634 by the India General Patents Designs and Trademarks as India Patent Publication No. 6967/CHENP/2013 A (94567-886650), on Aug. 1, 2014, 1 page.
U.S. Appl. No. 13/034,482, filed Feb. 24, 2011, Notice of Allowance mailed Aug. 29, 2014, 45 pages.
U.S. Appl. No. 13/035,474, filed Feb. 25, 2011, Final Rejection mailed Aug. 27, 2014, 38 pages.
U.S. Appl. 13/006,270, filed Jan. 13, 2011, Non-Final Office Action mailed Sep. 12, 2014, 41 pages.
U.S. Appl. No. 13/302,717, filed Nov. 22, 2011 Non-Final Rejection mailed Dec. 18, 2014, 71 pages.
U.S. Appl. No. 13/028,030, filed Feb. 15, 2011, Non-Final Office Action mailed Feb. 6, 2015, 56 pages.
U.S. Appl. No. 12/973,431, filed Dec. 20, 2010 Non-Final Rejection mailed Dec. 19, 2014, 30 pages.
The Notice of Allowance received Dec. 16, 2014 for Mexican Patent Application No. MX/a/2013/009882 is not translated into English, 1 page.
International Preliminary Report on Patentability of PCT/US2011/059977 mailed on Jun. 6, 2013, 6 pages.
International Preliminary Report on Patentability of PCT/US2011/068161 mailed on Jul. 25, 2013, 13 pages.
International Preliminary Report on Patentability of PCT/US2012/025502 mailed Sep. 6, 2013, 9 pages.
Liu, Yue et al., "Recognition of QR code with mobile phones," Control and Decision Conference, 2008. CCDC 2008. Jul. 2-4, 2008, pp. 203, 206.
U.S. Appl. No. 12/964,478, filed Dec. 9, 2010, Final Office Action mailed Sep. 16, 2013, 12 pages.
U.S. Appl. No. 12/961,369, filed Dec. 6, 2010, Non-Final Office Action mailed Jul. 12, 2013, 22 pages.
U.S. Appl. No. 12/971,349, filed Dec. 7, 2010, Notice of Allowance mailed Oct. 2, 2013, 24 pages.
U.S. Appl. No. 12/981,244, filed Dec. 29, 2010, Final Office Action mailed Oct. 30, 2013, 10 pages.
U.S. Appl. No. 13/016,483, filed Jan. 28, 2011 Final Office Action mailed Jun. 27, 2013, 13 pages.
U.S. Appl. No. 12/965,645, filed Dec. 10, 2010, Non-Final Office Action, mailed Jul. 19, 2013, 20 pages.
U.S. Appl. No. 12/973,431, filed Dec. 20, 2010, Final Office Action mailed Aug. 27, 2013, 11 pages.
U.S. Appl. 13/006,270, filed Jan. 13, 2011, Non-Final Office Action mailed Oct. 8, 2013, 20 pages.
U.S. Appl. No. 13/028,030, filed Feb. 15, 2011, Non-Final Office Action mailed Dec. 17, 2013, 60 pages.
U.S. Appl. No. 13/035,525, filed Feb. 25, 2011, Final Office Action mailed Sep. 12, 2013, 21 pages.
U.S. Appl. No. 13/037,302, filed Feb. 28, 2011 Final Office Action mailed Oct. 16, 2013, 28 pages.
U.S. Appl. No. 13/037,316 filed Feb. 28, 2011, Final Office Action mailed Aug. 28, 2013, 13 pages.
U.S. Appl. No. 13/192,287, filed Jul. 27, 2011 Non Final Office Action mailed Jun. 13, 2013, 22 pages.
U.S. Appl. No. 13/673,480, filed Nov. 9, 2012 Final Office Action mailed Sep. 9, 2013, 10 pages.
U.S. Appl. No. 13/673,480, filed Nov. 9, 2012 Notice of Allowance mailed Nov. 12, 2013, 16 pages.
U.S. Appl. No. 13/475,794, filed May 18, 2012 Non-Final Office Action mailed Sep. 18, 2013, 19 pages.
U.S. Appl. No. 12/964,478, filed Dec. 9, 2010, Non-Final Office Action mailed Mar. 26, 2013, 19 pages.
U.S. Appl. No. 12/973,431, filed Dec. 20, 2010, Non-Final Rejection mailed May 15, 2013, 30 pages.
U.S. Appl. No. 13/014,591, Notice of Allowance mailed May 24, 2013, 32 pages.
U.S. Appl. No. 13/007,317, Notice of Allowance mailed May 13, 2013, 16 pages.
U.S. Appl. No. 13/031,115, Notice of Allowance mailed Apr. 16, 2013, 24 pages.
U.S. Appl. No. 13/034,482, filed Feb. 24, 2011, Final Office Action mailed Apr. 25, 2013, 19 pages.
U.S. Appl. No. 13/035,474, filed Feb. 25, 2011, Final Rejection mailed Mar. 29, 2013, 20 pages.
U.S. Appl. No. 12/960,285, filed Dec. 3, 2010, Final Office Action mailed Apr. 18, 2013, 14 pages.
U.S. Appl. No. 13/035,525, filed Feb. 25, 2011, Non-Final Office Action mailed May 15, 2013, 15 pages.
Notice of Allowance and search report for ROC (Taiwan) Patent Application No. 101106288 received May 29, 2015, 9 pages.
The Second Office Action dated Jun. 1, 2015 for Mexican Patent Application No. MX/a/2013/007672 is not translated into English, 2 pages.
The First Office Action dated Jul. 13, 2015 for Mexican Patent Application No. MX/a/2013/009791 is not translated into English, 2 pages.
Office Action and Search Report from the State Intellectual Property Office for CN Pat. Appln. No. 201180066584.7 issued on Jul. 10, 2015, 12 pages.
U.S. Appl. No. 13/035,474, filed Feb. 25, 2011 Non Final Rejection mailed Sep. 11, 2015, 65 pages.
U.S. Appl. No. 13/864,474, filed Apr. 17, 2013 Non Final Office Action mailed Aug. 11, 2015, 59 pages.
Office Action dated Feb. 10, 2015 for Mexican Patent Application No. MX/a/2013/006770, 2 pages.
Office Action dated Feb. 6, 2015 for Mexican Patent Application No. MX/a/2013/006520, 2 pages.
Office Action dated Feb. 18, 2015 for Mexican Patent Application No. MX/a/2013/009794, 1 page.
Office Action and Search Report for ROC (Taiwan) Patent Application No. 100149344 issued Jan. 23, 2015, 8 pages.
Office Action for European Patent Application No. 12707435.9 dated Mar. 12, 2015, 6 pages.
U.S. Appl. No. 13/006,270, filed Jan. 13, 2011, Final Office Action mailed Mar. 23, 2014, 51 pages.
First Examination Report from European Patent Office dated May 18, 2015 for EP 11849496.2 7 pages.
European Office Action for EP 11842890.3 dated Mar. 13, 2015, 8 pages.
European Search Report for EP 11855065 dated Mar. 6, 2014, 6 pages.
Office Action for EP 11855065 dated Mar. 13, 2015, 6 pages.
Notice of Allowance by the Mexican Institute of Industrial Property for Mexican Patent Application No. MX/a/2013/009881 dated Jan. 12, 2015, 1 page.
First Office Action for CN 201180065044.7 issued Feb. 13, 2015 by the State Intellectual Property Office, 4 pages.
U.S. Appl. No. 13/475,794, filed May 18, 2012 Final Office Action mailed Jun. 1, 2015, 45 pages.
U.S. Appl. No. 13/302,717, filed Nov. 22, 2011 Final Rejection mailed May 8, 2015, 44 pages.
U.S. Appl. No. 13/037,302, filed Feb. 28, 2011 Final Office Action mailed May 4, 2015, 54 pages.
U.S. Appl. No. 13/016,483, filed Jan. 28, 2011 Final Office Action mailed May 13, 2015, 34 pages.
U.S. Appl. No. 12/960,285, filed Dec. 3, 2010 Non-Final Office Action mailed May 14, 2015, 21 pages.
U.S. Appl. No. 12/973,431, filed Dec. 20, 2010 Notice of Allowance mailed May 28, 2015, 20 pages.
Office Action from European Patent Office for Application No. 11852630.0 dated May 12, 2015, 7 pages.
Office Action from State Intellectual Property Office for CN Appln. No. 201180056242.7, received Jun. 17, 2015, 10 pages.
Office Action dated Apr. 22, 2015 for Mexican Patent Application No. MX/a/2013/009883, 2 pages.
U.S. Appl. No. 13/028,030, filed Feb. 15, 2011, Final Office Action mailed Jul. 17, 2015, 63 pages.
U.S. Appl. No. 13/302,717, filed Nov. 22, 2011 Non Final Rejection mailed Jun. 16, 2016, all pages.

(56) References Cited

OTHER PUBLICATIONS

U.S. Appl. No. 13/016,483, filed Jan. 28, 2011 Final Office Action mailed Jul. 5, 2016, all pages.
U.S. Appl. No. 13/037,302, filed Feb. 28, 2011, Final Office Action mailed Jul. 12, 2016, all pages.
U.S. Appl. No. 13/475,794, filed May 18, 2012 Non Final Office Action mailed Jul. 29, 2016, all pages.
U.S. Appl. No. 13/864,474, filed Apr. 17, 2013 Non Final Office Action mailed Mar. 23, 2016, all pages.
U.S. Appl. No. 12/960,285, filed Dec. 3, 2010, Notice of Allowance mailed Nov. 18, 2015, 31 pages.
Second Office Action for CN 201180065044.7 issued Sep. 9, 2015 by the State Intellectual Property Office (SIPO), 20 pages.
European Office Action for EP 11842890.3 dated May 9, 2016, all pages.
Office Action for European Patent App. 12704473.3 mailed Apr. 29, 2016, all pages.
Supplementary European Search Report for EP 11843423 completed Mar. 23, 2016, 8 pages.
Supplementary European Search Report for EP 11843045 completed Mar. 31, 2016, all pages.
First Office Action including Search Report from the State Intellectual Property Office for CN Patent Appln. No. 201280014034.5 issued on Apr. 5, 2016, all pages.
Office Action and Search Report for ROC (Taiwan) Pat. Appln. No. 101106313 received May 12, 2016, all pages.
Notice of Decision to Grant for CN 201280010873 on Mar. 25, 2016, all pages.
Examination Search Report from the European Patent Office dated Dec. 4, 2015 for EP 12707418.5, 8 pages.
European Office Action for EP 12716751.8 mailed Nov. 11, 2015, 4 pages.
Office Action for EP 11850819.1 dated Nov. 12, 2015, 4 pages.
First Office Action with Search Report for CN 201280013891.3 issued Jan. 15, 2016, 13 pages.
First Office Action and Search Report from State Intellectual Property Office for CN Appln. No. 201180064527.5 issued Oct. 23, 2015, 10 pages.
Notice of Allowance mailed Nov. 10, 2015 for Mexican Patent Application No. MX/a/2013/007672, 1 page.
Notice of Allowance for Mexican Patent Application No. MX/a/2013/006973 dated Sep. 4, 2015, 1 page.
Second Office Action issued by State Intellectual Property Office for CN Pat. Appln. No. 201180066584.7 issued on Jan. 11, 2016, 5 pages.
Search Report for Patent Application ROC (Taiwan) Patent Application No. 100149344 mailed Oct. 28, 2015, 1 page.
U.S. Appl. No. 13/302,717, filed Nov. 22, 2011 Non Final Rejection mailed Dec. 2, 2015, 27 pages.
U.S. Appl. No. 13/016,483, filed Jan. 28, 2011 Non-Final Office Action mailed Dec. 14, 2015, 27 pages.
U.S. Appl. No. 13/037,302, filed Feb. 28, 2011, Non-Final Office Action mailed Jan. 12, 2016, 62 pages.
U.S. Appl. No. 13/192,287, filed Jul. 27, 2011, Notice of Allowance mailed Dec. 14, 2015, 14 pages.
U.S. Appl. No. 13/864,474, filed Apr. 17, 2013 Final Office Action mailed Nov. 20, 2015, all pages.
Second Office Action from State Intellectual Property Office for CN Appln. No. 201180056242.7 issued Jan. 26, 2016, all pages.
First Office Action and Search Report from the State Intellectual Property Office (SIPO) for CN 201180056249.9 issued on Feb. 3, 2016, all pages.
First Office Action for CN 201280010873 issued Mar. 2, 2016, all pages.
U.S. Appl. No. 13/037,302, filed Feb. 28, 2011, Notice of Allowance mailed Feb. 16, 2017, all pages.
U.S. Appl. No. 13/864,474, filed Apr. 17, 2013 Notice of Allowance mailed Feb. 16, 2017, all pages.
Office Action for EP 12705768.5 mailed May 25, 2016, all pages.
Office Action for Korean Patent Application No. 10-2013-7015610 mailed Oct. 21, 2016, all pages. (no English translation available).
Office Action for EP 11811502.1 mailed Aug. 29, 2016, all pages.
Publication of Brazil appln No. BR 11 2013 012218-8 on Aug. 9, 2016, 1 page.
Second Office Action CN 201280013891.3 issued Aug. 12, 2016, all pages.
Third Office Action from State Intellectual Property Office for CN Appln. No. 201180056242.7 issued Jul. 28, 2016, all pages.
Second Office Action from State Intellectual Property Office for CN Appln. No. 201180064527.5 issued Jun. 12, 2016, all pages.
Rejection Decision for CN Appln. No. 201180064527.5 issued Oct. 9, 2016, all pages. (Translation).
Notice of Allowance for Mexican Patent Application No. MX/a/2013/009791 dated Mar. 15, 2016, 1 page.
Office Action dated Oct. 17, 2016 for European Patent Appln. No. 12701638.4, all pages.
Second Office Action issued by State Intellectual Property Office (SIPO) for CN 201180056249.9 issued on Feb. 4, 2017, all pages.
Office Action for Korean Patent Application No. 10-2013-7020207 mailed Dec. 21, 2016, all pages.
Office Action and Search Report for ROC (Taiwan) Pat. Appln. No. 101106313 received Nov. 4, 2016, all pages.
Notice of Allowance for Canadian Application 2,822,214 dated Nov. 28, 2016, 1 page.
U.S. Appl. No. 13/475,794, filed May 18, 2012 Notice of Allowance mailed Jan. 5, 2017, all pages.
U.S. Appl. No. 14/852,787, filed Sep. 14, 2015, Non-Final Office Action mailed Sep. 14, 2016, all pages.
U.S. Appl. No. 14/852,787, filed Sep. 14, 2015, Final Office Action mailed Jan. 13, 2017, all pages.
Decision to Grant for Korean Patent Application No. 10-2013-7020207 on Mar. 9, 2017, all pages.
Office Action for Korean Patent Application No. 10-2013-7015610 mailed Feb. 21, 2017, all pages.

* cited by examiner

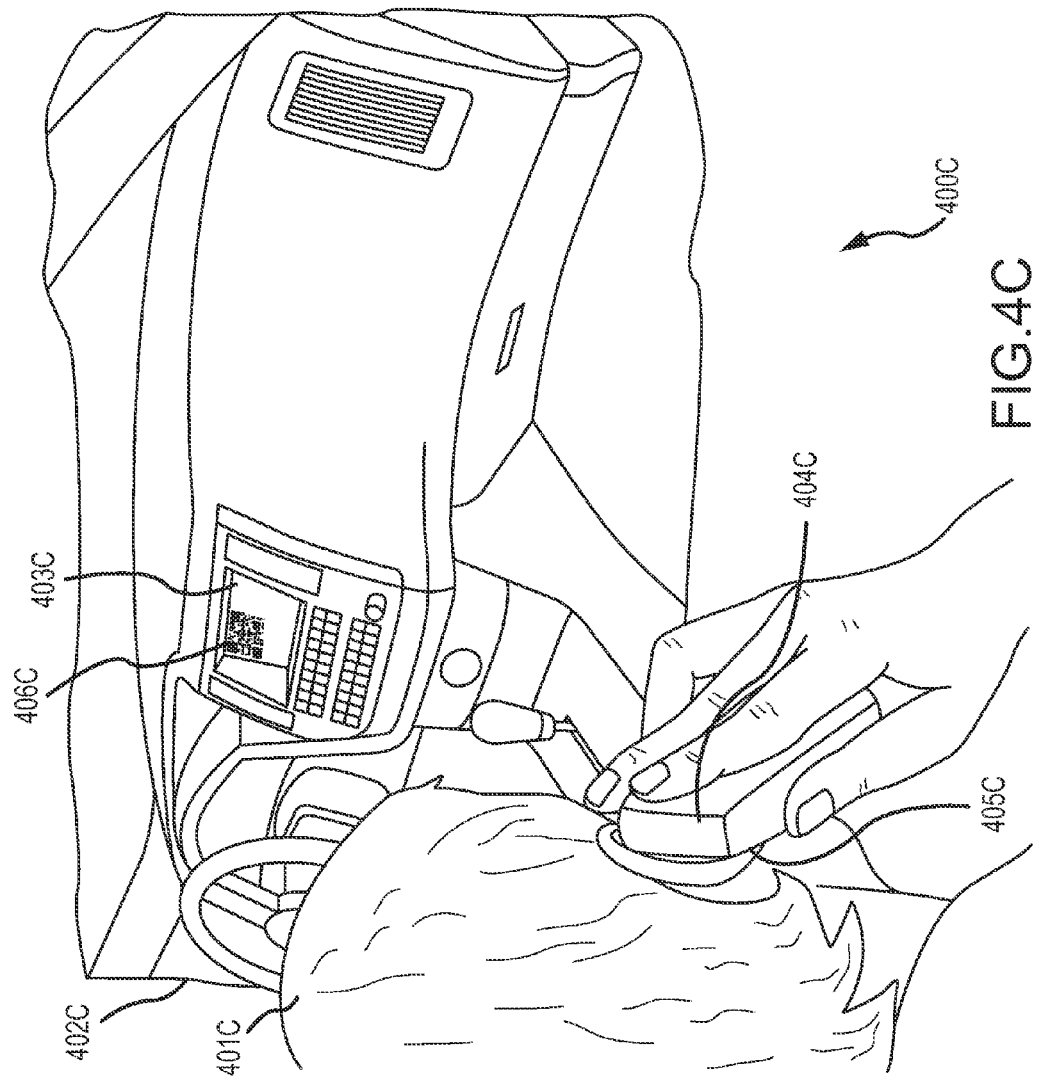

1

FACILITATING USER SUPPORT OF ELECTRONIC DEVICES USING DYNAMIC MATRIX CODE GENERATION

FIELD OF THE INVENTION

This disclosure relates generally to user support of electronic devices, and more specifically to electronic devices dynamically generating matrix codes that include information specific to the electronic device as well as user support information which can then be displayed and scanned to initiate user support for a user of the electronic device.

SUMMARY

The present disclosure discloses systems and methods for helping provide user support for electronic devices utilizing dynamically generated matrix codes, such as (but not limited to) QR codes. An electronic device may derive information specific to the device (which may be related to the operation of the device), dynamically generate a matrix code that includes the information specific to the device and user support information, and transmit the dynamically generated matrix code to a display device. When a user captures the matrix code with a reader device, the reader device may decode (or use a back end server to decode) the information specific to the electronic device and the user support information and initiate a user support request.

In response to the initiated user support request, user support may then be provided for the user. Problems may be automatically taken care of for the user, tutorials may be provided for the user, service calls may be scheduled for the user, and so on. The user may also be provided notifications (via the electronic device, the reader device, and/or other communication devices) that the user support request has been received, notifications regarding the contents of the user support request, notifications regarding scheduled service calls, notifications regarding potential problem fixes, and various other notifications and/or other responses.

The information specific to the electronic device may include a variety of different information that is specific to the operation of the electronic device. such as electronic device identifiers, electronic device configuration, error codes for errors that have occurred during electronic device operation, account information for one or more customer accounts associated with the electronic device, a location of the electronic device, and so on. The user support information for the electronic device may include a variety of information that may be utilized to initiate user support requests such as a web site address to which to the information specific to the electronic device, a network address for a user support provider response system to which the information specific to the electronic device may be transmitted, an identifier for an application resident on the reader device to which the information specific to the electronic device may be passed, and so on.

In some implementations, the matrix code may be dynamically generated upon the occurrence of an error. However, in other implementations, the matrix code may be generated in response to receiving a user input. In various implementations, the electronic device may transmit the matrix code by themselves to a display device such that the matrix code will be the only element displayed on the display device at a particular time. In various other implementations, the electronic device may combine the matrix code with one or more images that are being transmitted to the display device and transmit the combination for simultaneous display.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

FIGS. 4A-4C are diagrams illustrating a second example system that facilitates user support for an automobile. The system may be the system of FIG. 1.

DETAILED DESCRIPTION OF THE EMBODIMENTS

Figure 1:
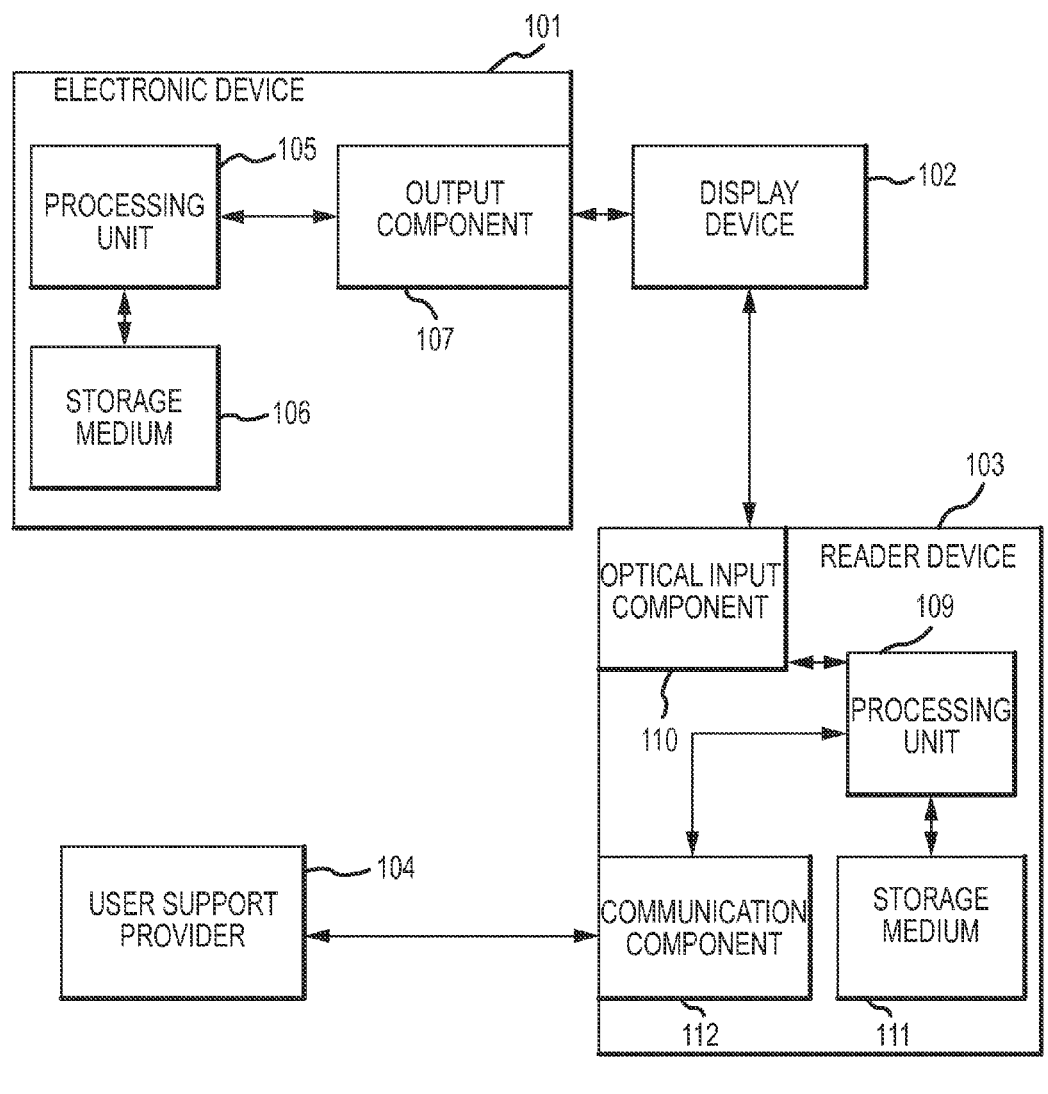
FIG. 1 is a block diagram illustrating a system for facilitating user support of an electronic device using dynamic matrix code generation.

The description that follows includes sample systems, methods, and computer program products that embody various elements of the present disclosure. However, it should be understood that the described disclosure may be practiced in a variety of forms in addition to those described herein.

Electronic devices (such as televisions, television receivers, digital video recorders, digital video disc players, automobiles, computing devices, telephones, kitchen appliances, video game systems, security systems, and so on) are often complex to operate. Users of electronic devices frequently utilize user support provided by manufacturers of the electronic devices, retailers of electronic devices, and so on in order to operate the electronic devices. This is particularly the case when errors occur during the operation of an electronic device. When an error does occur during the operation of an electronic device, a user of the electronic device may contact (such as by telephone, email, and so on) a user support provider in order to request user support from the provider. Such a user support provider may include the manufacturer or retailer of the electronic device, a third party contracted to provide user support for the electronic device, and so on.

However, requesting user support for an electronic device may be as complex for a user as operation of the electronic device itself. Often, a user may be required to locate contact information for a user support provider and wait on hold for extensive periods of time or wait extensive periods of time for a response. Further, the user support provider may need the user to provide extensive amounts of information regarding the electronic device (such as customer account information, electronic device identifiers, electronic device configuration information, detailed descriptions of errors, and so on) which may be burdensome for the user or beyond their level of understanding. As such, the user's ability to obtain desired user support and/or ability to operate the electronic device may be frustrated.

The present disclosure discloses systems and methods for facilitating user support of electronic devices using dynamic matrix code generation. An electronic device may derive information specific to the electronic device. The information specific to the electronic device may be related to the operation of the electronic device. The electronic device may then dynamically generate one or more matrix codes, such as (but not limited to) QR codes, that include the information specific to the electronic device. Further, the dynamically generated matrix code may include user support information for the electronic device. The electronic device may then transmit the dynamically generated matrix code to a display device (which may be integrated into the electronic device). When the user of the electronic device utilizes a reader device (such as a smart phone, a mobile computing device, and so on) to detect the matrix code, the reader device may decode (or use a back end server to decode) the information specific to the electronic device and the user support information and may initiate a user support request based on the decoded information.

FIG. 1 is a block diagram illustrating a system 100 for facilitating user support of an electronic device using dynamic matrix code generation. The system 100 may include a electronic device 101 (which may be any kind of electronic device such as a television, a television receiver, a digital video recorder, a digital video disc player, an automobile, a computing device, a telephone, a kitchen appliance, a video game system, a security system, and so on), at least one display device 102 (which may be any kind of display device such as a cathode ray tube display, a liquid crystal display, a television, a computer monitor, and so on), and a reader device 103 (which may be any kind of device capable of detecting and decoding a matrix code such as a telephone equipped with a camera, a mobile computing device that includes a camera, and so on). The system may also include a user support provider 104.

The electronic device 101 may include one or more processing units 105, one or more one or more non-transitory storage media 106 (which may take the form of but is not limited to a magnetic storage medium; optical storage medium; magneto-optical storage medium; read only memory; random access memory; erasable programmable memory; flash memory; and so on), and one or more output components 107. Additionally, although the display device 102 is illustrated as separate from the electronic device, it is understood that in various implementations the display device may be incorporated into the electronic device. The processing unit of the electronic device may execute instructions stored in the non-transitory storage medium to derive information specific to the electronic device that relates to operation of the electronic device, dynamically generate one or more matrix codes (such as one or more QR codes) that include the information specific to the electronic device as well as user support information for the electronic device, and transmit the dynamically generated matrix code to the display device utilizing the output component.

Subsequently, the reader device 103 may detect the matrix code displayed by the display device 102, decode the information specific to the electronic device 101 and the user support information, and initiate one or more user support requests based on the decoded information. As part of initiating the user support request, the reader device may transmit the information specific to the electronic device to the user support provider 104. The user support information may include information regarding how the reader device will transmit the information specific to the electronic device to the user support provider (such as including a web address whether the user support provider may be contacted, an email address for a user support representative of the user support provider, a telephone number for the user support provider and so on. The reader device may include one or more processing units 109 which execute instructions stored in one or more non-transitory storage media 111 in order to perform the above described functions. The reader device may also include an optical input device 110 (such as a camera, a barcode scanner, and so on) for detecting the matrix code displayed by the display device as well as a communication component 112 for communicating with the user support provider.

The information specific to the electronic device 101 may include a variety of different information that is specific to the operation of the electronic device. For example, the information may include electronic device identifiers (such as network addresses, serial numbers, media access control numbers, and so on), electronic device configuration information (such as the individual hardware components included in the electronic device and/or identifiers for such components, drivers utilized on the electronic device, options set for the electronic device, a current status of the electronic device, and so on), error codes for errors that have occurred during electronic device operation (such as an error number associated with an error that has occurred, debug information, a core dump, and so on), account information for one or more customer accounts (such as subscription service accounts, warrantee accounts, support agreement accounts, and so on) associated with the electronic device, a location of the electronic device (such as a global positioning system location, a mailing address, and so on), and so on. For instance, in implementations where the electronic device includes a television receiver, the information specific to the television receiver may include a serial number for the receiver, a media access control number for the receiver, current settings for the receiver, current channel information for the receiver, account information for a programming subscription related to the television receiver, information on hardware included in the television receiver, a mailing address associated with the television receiver, and so on.

The user support information for the electronic device 101 may include a variety of information that may be utilized to initiate user support requests based on the information specific to the electronic device. For example, the user support information may include a web site address to which to transmit error codes and the web site may provide a user tutorials regarding operation of the electronic device related to the error code. By way of another example, the user support information may include a network address for a user support provider 104 response system to which user contact information, electronic device identifiers, error codes, and so on may be transmitted such that the response system may automatically correct a problem with the electronic device, schedule a service call (which may be performed via telephone, email, an onsite visit, and so on) and inform the user of the scheduled service call, and so on. By way of still another example, user support information may include an identifier for an application resident on the reader device 103 such as an electronic device password recovery application which may be passed an encrypted version of the password, one or more password recovery verification questions, and one or more encrypted password recovery verification answers. As such, the electronic device password recovery application may prompt a user with the one or more password recovery verification questions, compare the user's answers with the encrypted answers, and present the user with a decrypted version of the password if the answers are correct.

In some implementations, the electronic device 101 may dynamically generate the matrix codes upon the occurrence of an error during operation of the electronic device. For example, a refrigerator may dynamically generate a matrix code that includes an error code and transmit the matrix code to an associated display device when a cooling component ceases cooling. In other implementations, the electronic device 101 may dynamically generate the matrix codes in response to receiving a user input. For example, a user may call a user support line to obtain user support for a software product on a computer. A user support representative assisting the user may need to know configuration information about the computer in order to provide user support. The user support representative may include the user to launch a program on the computer for dynamically generating and displaying a matrix code that, when the user scans it with their smart phone, decodes the configuration information and transmits it to the user support representative.

In various implementations, the electronic device 101 may transmit the one or more matrix codes by themselves to the display device 102 via the output component 107 for the display device to display only the one or more matrix codes at a particular time. However, in various other implementations (such as implementations where the electronic device is a television receiver, digital video recorder, or other such device that provides images to a display), the electronic device may transmit one or more images (such as a video stream) to the display device via the output component. In such implementations, the electronic device may combine the one or more matrix codes with the one or more images and transmit the combination to the display device via the output component.

Figure 2:
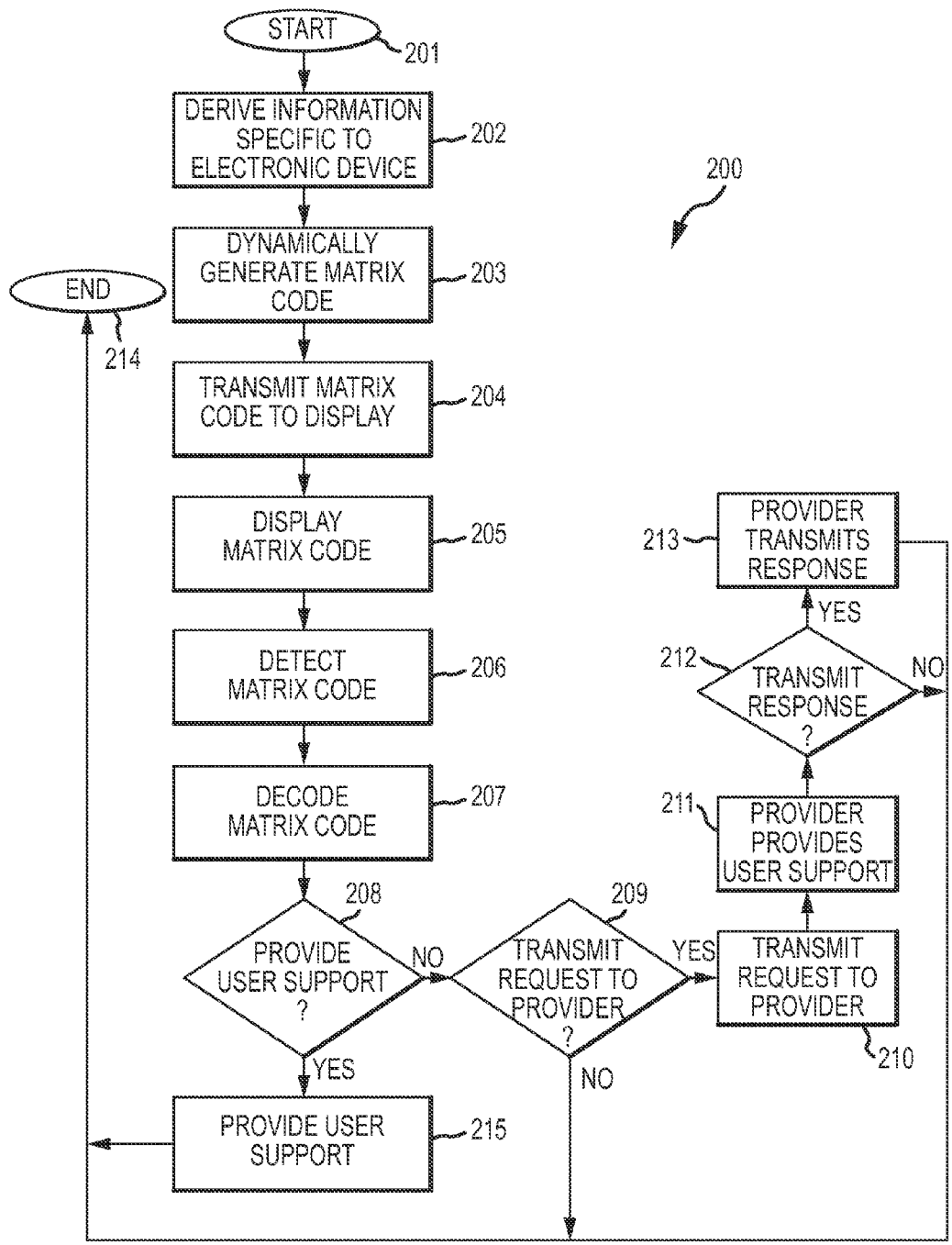
FIG. 2 is a flow chart illustrating a method for facilitating user support of an electronic device using dynamic matrix code generation. This method may be performed by the system of FIG. 1.

FIG. 2 illustrates a method 200 for facilitating user support of an electronic device using dynamic matrix code generation. The method 200 may be performed by the system 100 of FIG. 1. The flow begins at block 201 and proceeds to block 202 where the processing unit 105 of the electronic device 101 derives the information specific to the electronic device. The flow then proceeds to block 203 where the processing unit dynamically generates a matrix code (such as a QR code) that includes the information specific to the electronic device and the user support information. Then, the flow proceeds to block 204 where the processing unit transmits the dynamically generated matrix code to the display device 102 via the output component 107 before the flow proceeds to block 205.

At block 205, the display device 102 displays the matrix code that was transmitted by the processing unit 105 of the electronic device 101 via the output component 107. The flow then proceeds to block 206.

At block 206, the reader device 103 detects the matrix code displayed on the display device 102. The flow then proceeds to block 207 where the reader device decodes the detected matrix code. Decoding the detected matrix code may include decoding the information specific to the electronic device and the user support information that is included in the matrix code. The flow then proceeds to block 208 where the reader device determines from the decoded user support information whether or not the reader device will provide user support. If so, the flow proceeds to block 215 where the reader device provides the user support before the flow proceeds to block 214 and ends. Otherwise, the flow proceeds to block 209.

At block 209, after the reader device 103 determines that the reader device will not provide user support, the reader device 103 determines from the decoded user support information whether or not to transmit a user support request to the user support provider 104. If not, the flow proceeds to block 214 and ends. Otherwise, the flow proceeds to block 210 where the reader device transmits a user support request including the decoded information specific including the electronic device to the user support provider 104 as specified by the decoded user support information.

The flow then proceeds to block 211 where the user support provider 104 provides the requested user support and the flow proceeds to block 212. At block 212, the user support provider determines whether or not to transmit a response to the user support request. The user support provider may not submit a response to the user support request if the user support request can be fulfilled without additional user involvement. However, the user support provider may submit a response for a variety of reasons such as if the user support request cannot be fulfilled without additional user involvement (i.e., if the user support provider needs to schedule a telephone call with the user to provider the requested user support), if the user support provider provides a confirmation (i.e., an acknowledgement that the user support request was received, a notification as to the contents of the user support request that was received, and so on), if the user support provider will provide tutorials concerning the user support request, and so on.

If the user support provider 104 determines not to transmit a response to the user support request, the flow proceeds to block 214 and ends. Otherwise, the flow proceeds from block 212 to block 213 where the user support provider transmits the response. The user support provider may transmit the response to the reader device 103, the electronic device 101, another communication device utilized by the user (such as a telephone, an in person visit, an email address, and so on), and so on. The flow then proceeds to block 214 and ends.

It should be understood that the specific steps as well as the specific order or hierarchy of steps described in method 200 is an example of a sample approach. In other implementations, some of the specific steps as well as the specific order or hierarchy of steps in the method may be rearranged while remaining within the disclosed subject matter.

Figure 3A:
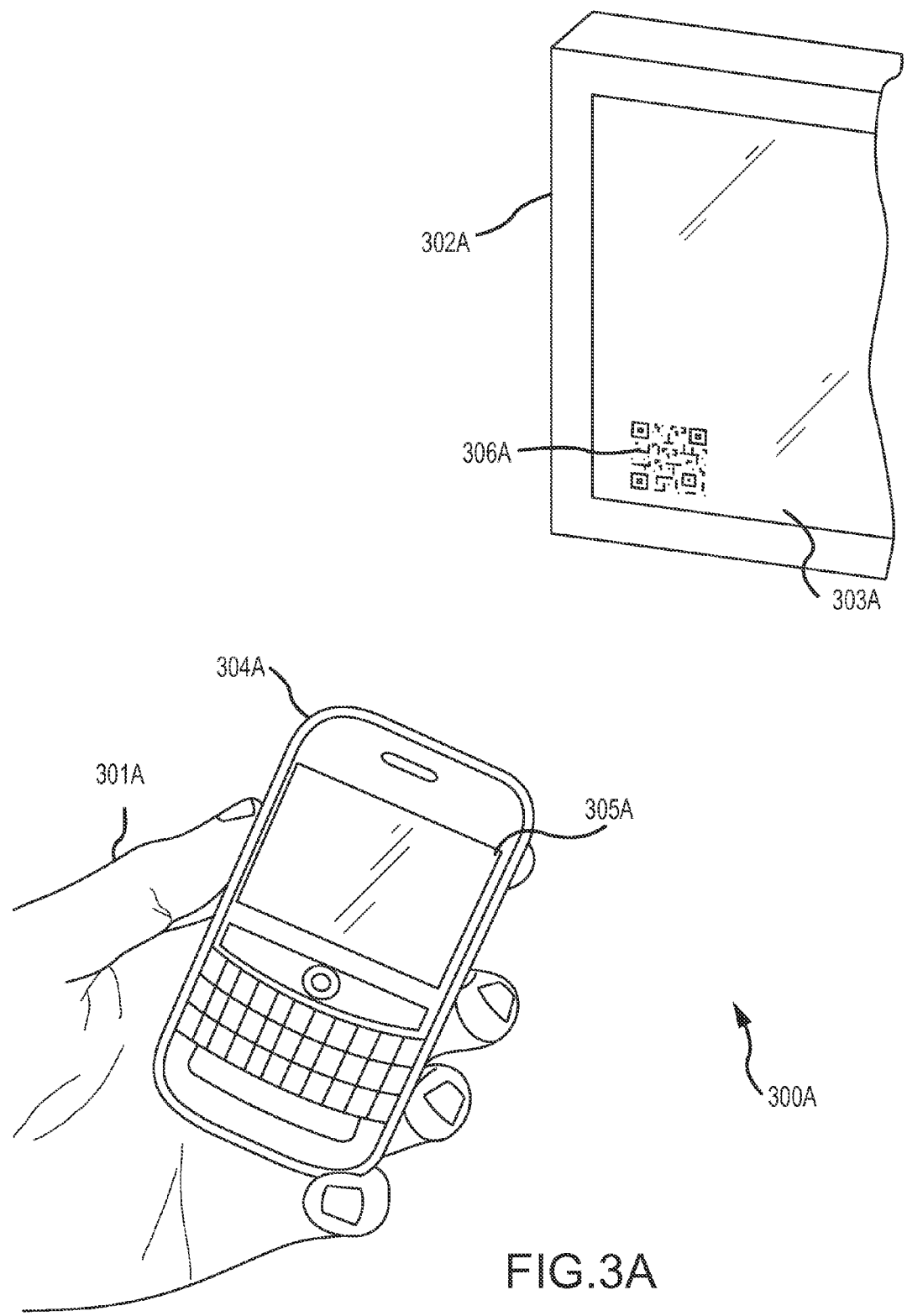
FIGS. 3A-3B are diagrams illustrating a first example system that facilitates user support for a television receiver. The system may be the system of FIG. 1.
Figure 3B:
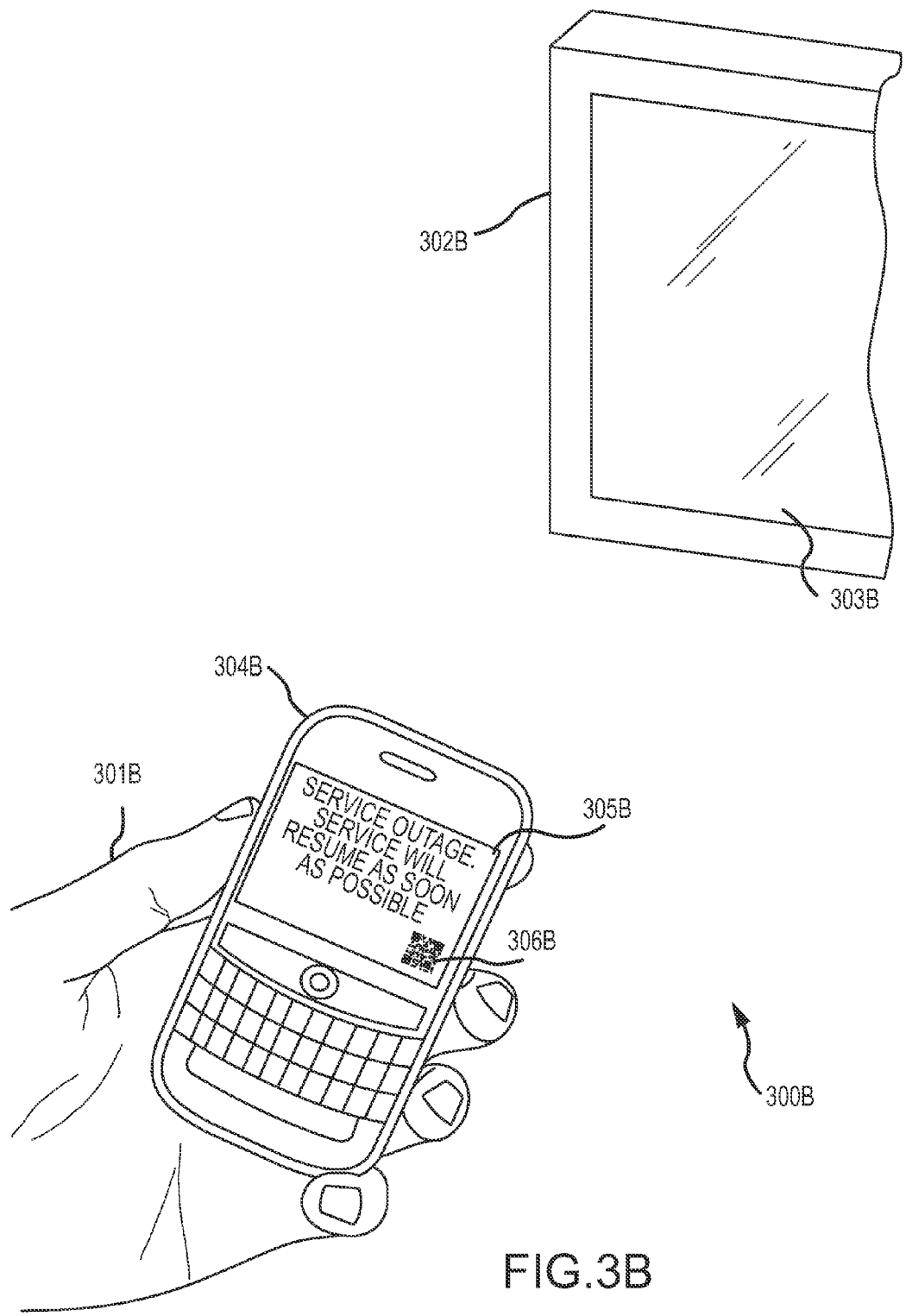

FIGS. 3A-3B illustrate a first example system 300A-300B that facilitates user 301A-301B support for a television receiver. As illustrated in FIG. 3A, the system 300A includes a television 302A (which incorporates a television receiver for receiving television programming from a programming provider for the television 302A) and a user 301A. In this example, the television detects an error condition because the television receiver is not receiving a signal from the programming provider. As such, the television dynamically determines information specific to the television which includes a physical address associated with the television receiver, a network address for the television receiver, an identifier for the television receiver, an account number for the programming provider account associated with the television receiver, and an error code corresponding to the error condition of no signal. The television dynamically generates a QR code 306A that includes the dynamically determined information specific to the television. Further, the television includes user support information in the QR code specifying to transmit the information specific to the television to a customer support system of the programming provider (such as via a web interface). The television then displays the QR code on the screen 303A of the television. In order to request user support, the user takes a picture of the QR code on the screen of the television with a cellular phone 304A that is executing a QR code reader program. The QR code reader program detects and decodes the QR code. Based on the decoded user support information, the cellular phone then transmits the decoded information specific to the television to the customer support system of the programming provider.

In this example, the television receiver is not receiving a signal from the programming provider because of a network outage that the programming provider is already aware of and is already attempting to fix. As such, the programming provider may transmit a response to the user indicating that the problem is related to a service outage that the programming provider is working to correct. FIG. 3B depicts a response from the programming provider received by the cellular phone 304B and displayed on a display screen 305B of the cellular phone.

Figure 4A:
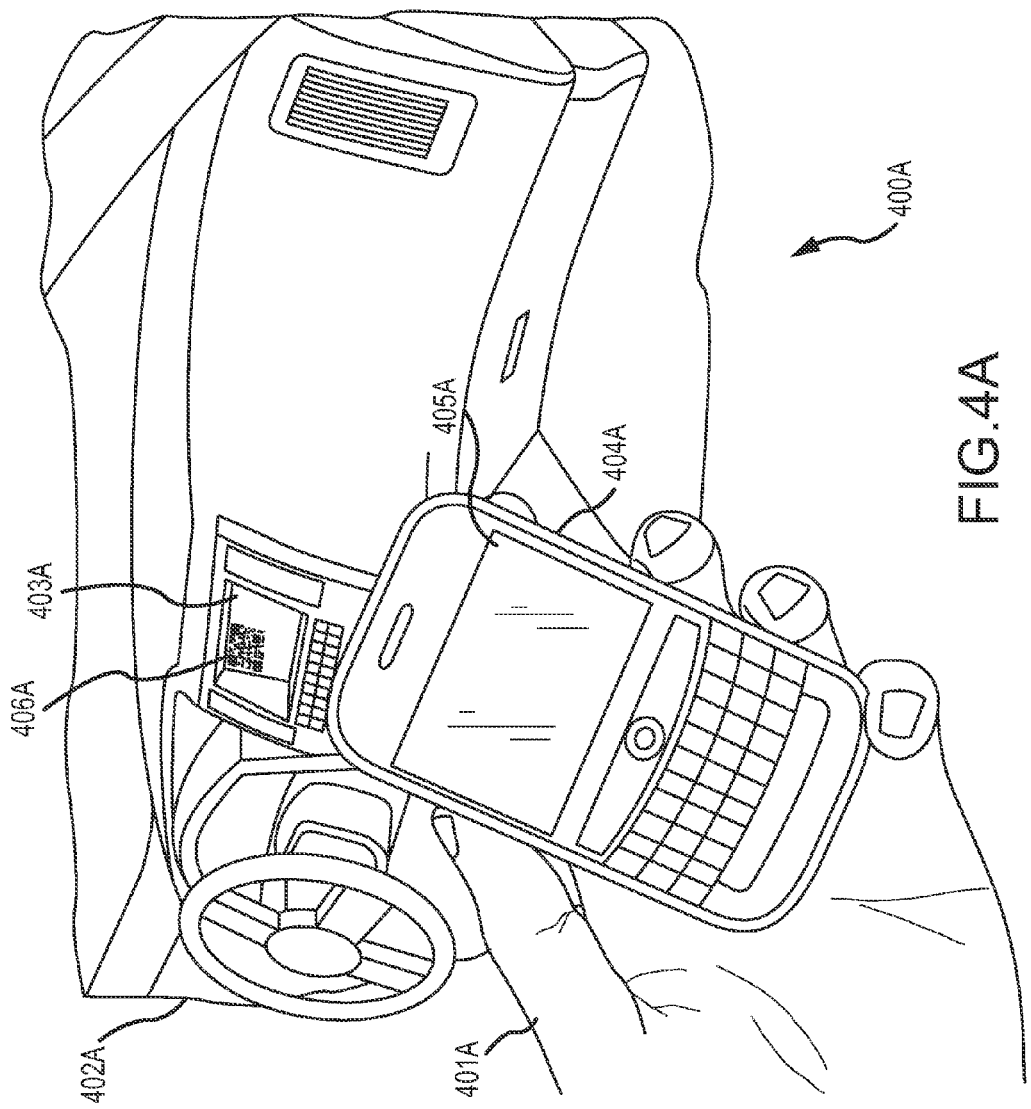
Figure 4B:
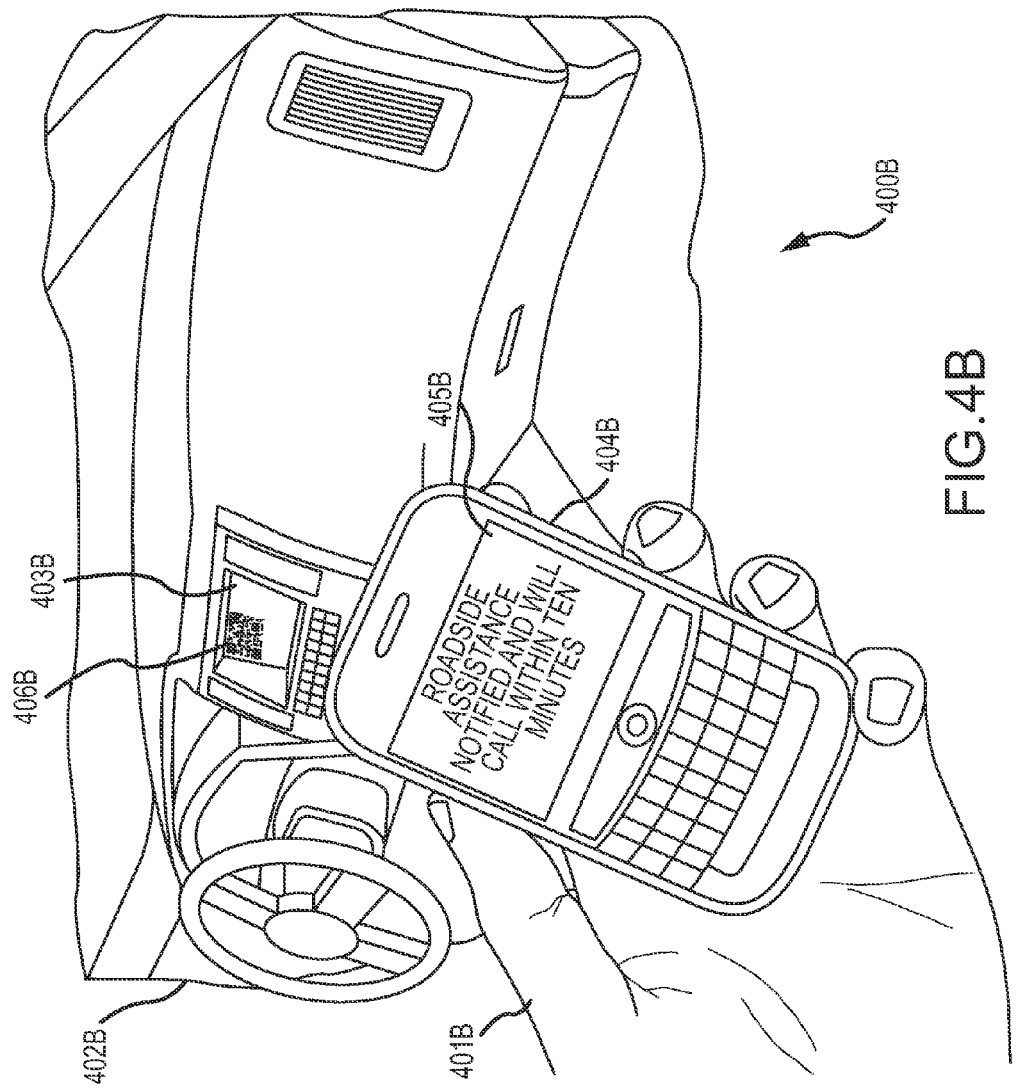

FIGS. 4A-4C illustrate a second example system 400A-400C that facilitates user 401A-401C support for an automobile 402A-402C. As illustrated in FIG. 4A, the system 400A includes an automobile 402A and a user 401A. In this example, the automobile detects an error condition because the engine of the automobile has locked up. As such, the automobile dynamically determines information specific to the automobile which includes a global position system location for the automobile, name information for the owner of the automobile, account information for a roadside assistance account associated with the automobile, and an error code corresponding to the error condition of locked engine. The automobile dynamically generates a QR code 406A that includes the dynamically determined information specific to the automobile. Further, the automobile includes user support information in the QR code specifying to transmit the information specific to the automobile to a roadside assistance system (such as via a web interface). The automobile then displays the QR code on a dashboard display screen 503A of the automobile. In order to request user support, the user takes a picture of the QR code on the dashboard display screen with a personal digital assistant 404A that is executing a QR code reader program. The QR code reader program detects and decodes the QR code. Based on the decoded user support information, the personal digital assistant then transmits the decoded information specific to the automobile to the roadside assistance system.

In this example, the automobile 402A may require an on site mechanic visit in order to repair the locked engine. As such, the roadside assistance system may determine when a telephone support representative will be able to call the user 401A and transmit a notification regarding when the telephone support representative will call the user. FIG. 4B depicts a response from the roadside assistance system received by the personal digital assistant 404B and displayed on a display screen 405B of the personal digital assistant. As the response indicates, a telephone service representative from roadside assistance will call the user 401B within ten minutes to either help the user troubleshoot the problem, send out a mechanic, call a tow truck, and so on. FIG. 4C depicts the user 401C speaking to the telephone service representative when the telephone service representative makes the scheduled telephone service call to the personal digital assistant 404C.

Figure 5A:
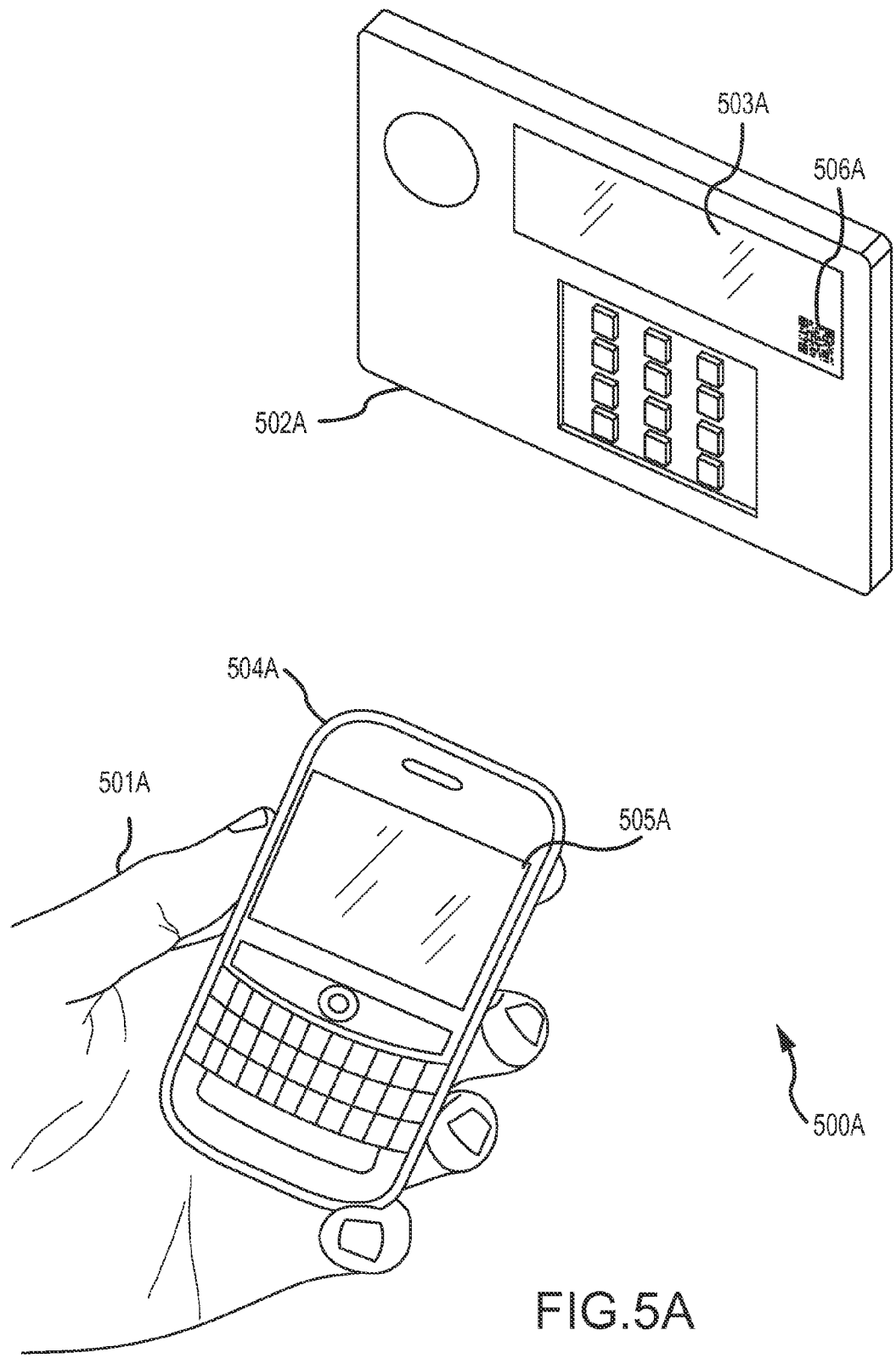
FIGS. 5A-5C are diagrams illustrating a third example system that facilitates user support for a security system. The system may be the system of FIG. 1.
Figure 5B:
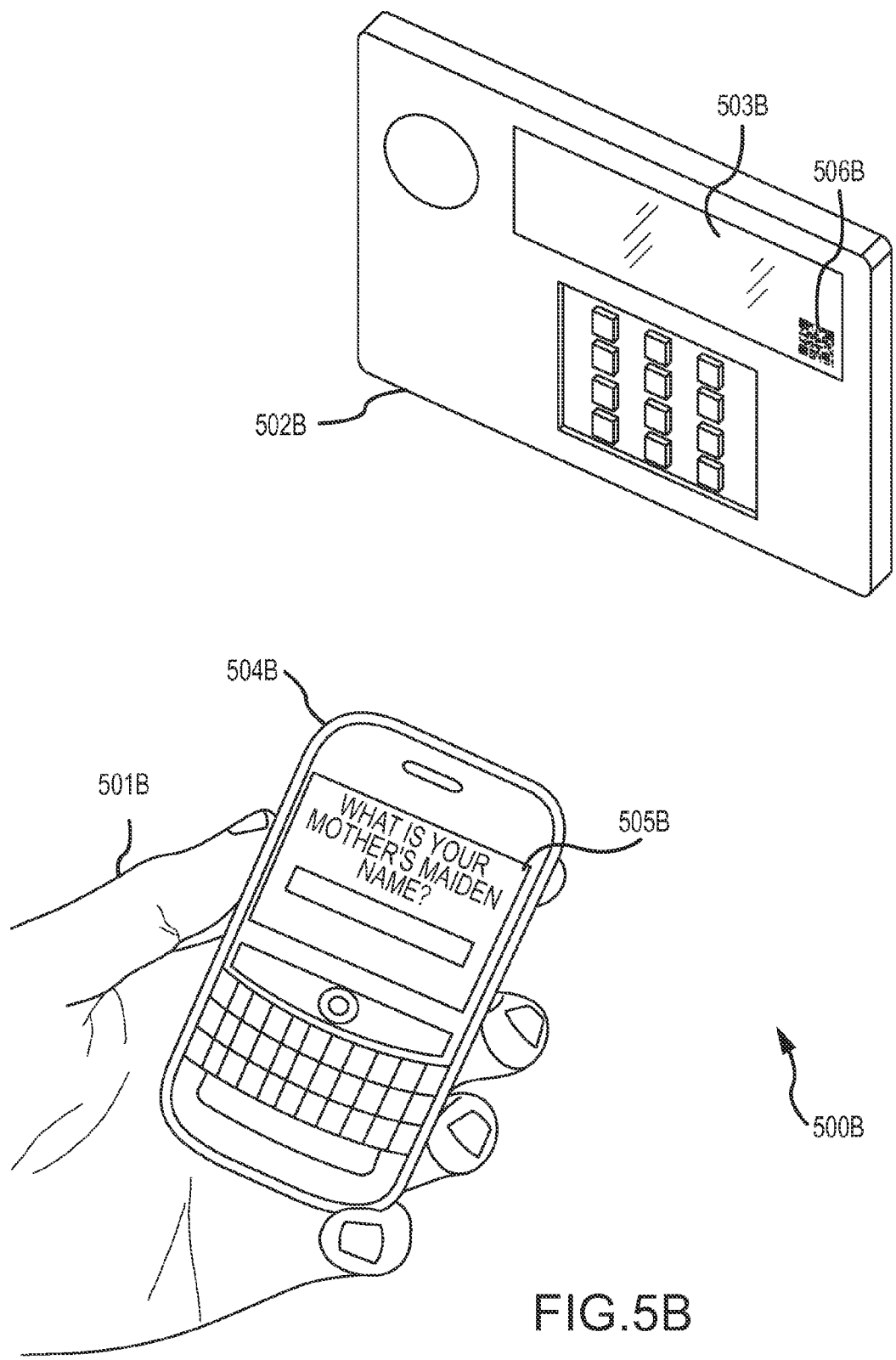
Figure 5C:
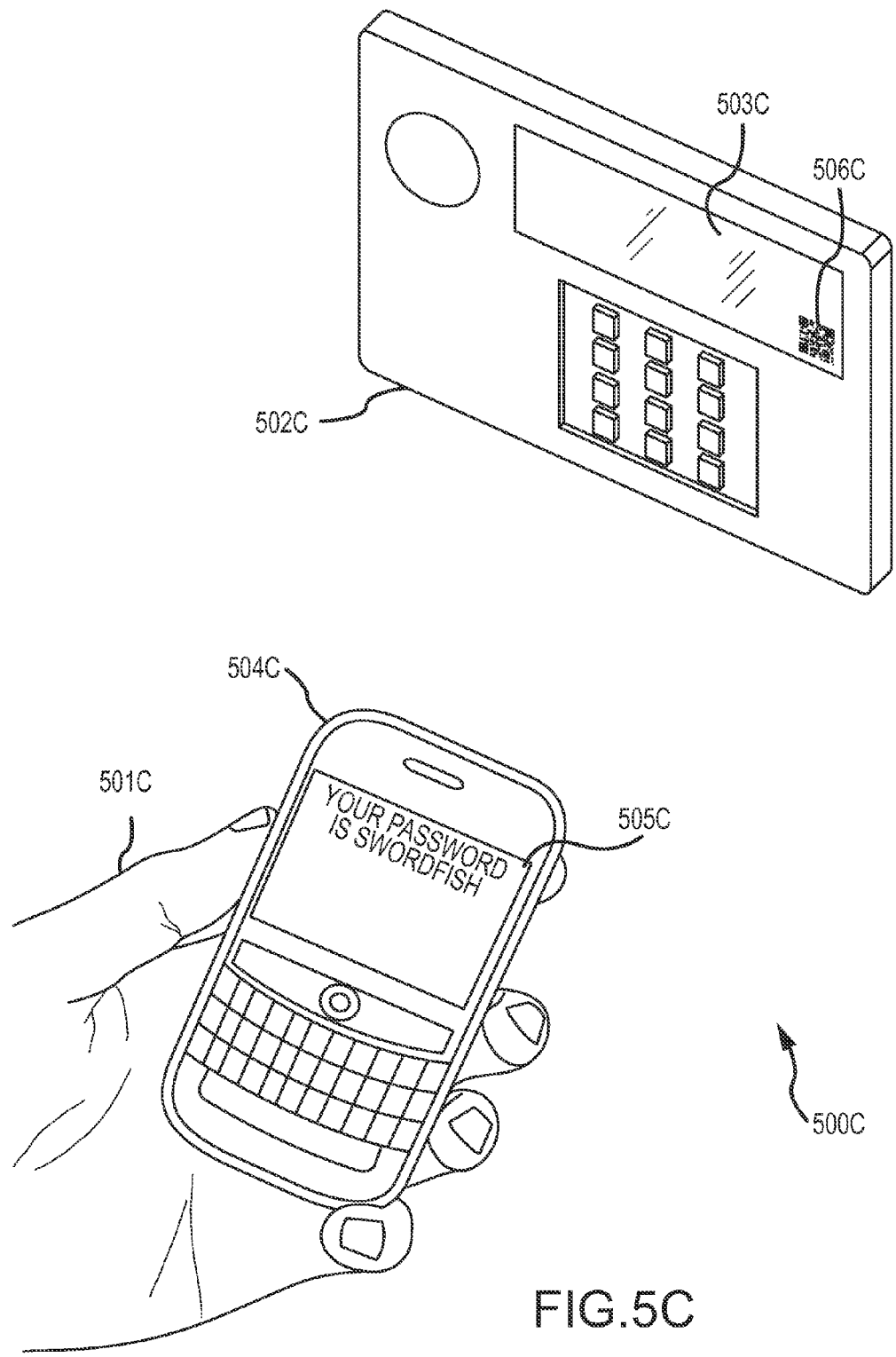

FIGS. 5A-5C illustrate a third example system 500A-500C that facilitates user support for a security system 502A-502C. As illustrated in FIG. 5A, the system 500A includes a security system 502A and a user 501A. In this example, the user may have forgotten a password stored by the security system and may have pressed a button for recovering the password. As such, the security system dynamically determines information specific to the security system which includes the password to recover, one or more passkey questions, and answers to the one or more passkey questions (any of which may be encrypted). The security system dynamically generates a QR code 506A that includes the dynamically determined information specific to the security system. Further, the security system includes user support information in the QR code identifying a password recovery program to initiate and supply with the information specific to the security system. The security system then displays the QR code on a control panel display screen 503A of the security system. In order to request user support, the user takes a picture of the QR code on the control panel display screen with a mobile computing device 504A that is executing a QR code reader program. The QR code reader program detects and decodes the QR code. Based on the decoded user support information, the mobile computing device initiates the password recovery program and passes the program the decoded information specific to the security system.

As illustrated in FIG. 5B, the password recovery program presents the user 501B with one or more of the passkey questions from the decoded information specific to the security system via a display screen 505B of the mobile computing device 504B, receives responses to the one or more passkey questions from the user, and compares the received answers to the decoded information specific to the security system. If the responses match the answers, the password recovery program presents the password to the user via the display screen 505C of the mobile computing device 504C, as illustrated in FIG. 5C.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for facilitating user support of electronic devices using dynamic matrix code generation, the method comprising:
    detecting, by an electronic device comprising a television receiver, an error condition experienced by the television receiver, the error condition corresponding to an error in an operation of the television receiver, where the electronic device detects the error condition without receiving an indication of the error condition from a remote provider that is remote from the electronic device;
    consequent to the detecting of the error condition, deriving, by the electronic device without receiving a signal from the remote provider, information specific to the television receiver, the information derived to specify i) an error code corresponding to the error in the operation of the television receiver, ii) a television receiver identifier of the television receiver, and iii) a customer identifier related to the electronic device;
    dynamically generating, utilizing the electronic device, at least one matrix code wherein the at least one matrix code includes the information specific to the television receiver and electronic device user support information; and
    transmitting, utilizing the electronic device, the at least one matrix code to at least one display device wherein the at least one matrix code is decodable by at least one reader device that optically detects the at least one matrix code displayed on the at least one display device to initiate an electronic device user support request.

2. The method of claim 1, wherein the at least one matrix code comprises at least one QR code.

3. The method of claim 1, wherein the electronic device user support information includes information for transmitting the information specific to the television receiver to a user support provider from the at least one reader device.

4. The method of claim 3, further comprising receiving a user support response from the user support provider that was transmitted in response to the transmitted information specific to the television receiver.

5. The method of claim 4, wherein the user support response includes scheduling information regarding a service call for the user support provider to provide user support for the electronic device.

6. The method of claim 1, wherein said operation of transmitting, utilizing the electronic device, the at least one matrix code to the at least one display device further comprises:

combining the at least one matrix code with at least one image; and
    transmitting the combination of the at least one matrix code and the at least one image to the at least one display device.

7. The method of claim 1, wherein the electronic device performs said operation of dynamically generating the at least one matrix code upon occurrence of at least one electronic device malfunction.

8. The method of claim 1, wherein the information specific to the television receiver includes at least one encoded password related to usage of the electronic device and the electronic device user support information includes information for recovering the at least one encoded password.

9. An electronic device comprising a television receiver, the electronic device including:
    at least one processing unit that:
        detects an error condition experienced by the television receiver, the error condition corresponding to an error in an operation of the television receiver, where the electronic device detects the error condition without receiving an indication of the error condition from a remote provider that is remote from the electronic device;
        consequent to the detecting of the error condition, derives, without receiving a signal from the remote provider, information specific to the television receiver, the information derived to specify i) an error code corresponding to the error in the operation of the television receiver, ii) a television receiver identifier of the television receiver, and iii) a customer identifier related to the electronic device; and
    at least one output component, communicably coupled to the at least one processing unit and at least one display device;
    wherein the at least one processing unit dynamically generates at least one matrix code and transmits the at least one matrix code to at least one display device via the at least one output component wherein the at least one matrix code includes the information specific to the television receiver and electronic device support information and the at least one matrix code is decodable by at least one reader device that optically detects the at least one matrix code displayed on the at least one display device to initiate an electronic device user support request.

10. The electronic device of claim 9, wherein the electronic device support information includes information for transmitting the information specific to the television receiver to a user support provider from the at least one reader device.

11. The electronic device of claim 9, wherein the at least one matrix code comprises at least one QR code.

12. The electronic device of claim 9, wherein the at least one processing unit transmits the at least one matrix code to the at least one display device via the at least one output component by combining the at least one matrix code with at least one image transmitting the combination of the at least one matrix code and the at least one image to the at least one display device via the at least one output component.

13. The electronic device of claim 9, wherein the at least one processing unit dynamically generates the at least one matrix code upon occurrence of at least one electronic device operational error.

14. The electronic device of claim 9, wherein the information specific to the television receiver includes at least one encoded password related to usage of the electronic device and the electronic device support information includes information for recovering the at least one encoded password.

15. A system for facilitating user support of electronic devices using dynamic matrix code generation, comprising:
an electronic device comprising a television receiver, the electronic device including:
at least one processing unit that:
detects an error condition experienced by the television receiver, the error condition corresponding to an error in an operation of the television receiver, where the electronic device detects the error condition without receiving an indication of the error condition from a remote provider that is remote from the electronic device;
consequent to the detecting of the error condition, derives, without receiving a signal from the remote provider, information specific to the television receiver, the information derived to specify i) an error code corresponding to the error in the operation of the television receiver, ii) a television receiver identifier of the television receiver, and iii) a customer identifier related to the electronic device; and
at least one output component;
wherein the at least one processing unit dynamically generates at least one matrix code and transmits the at least one matrix code to the at least one display device via the at least one output component wherein the at least one matrix code includes the information specific to the television receiver and electronic device support information; and at least one reader device, comprising:
at least one optical input device that detects the at least one matrix code displayed on the at least one display device;
at least one processing unit that decodes the information specific to the television receiver and the electronic device support information from the detected at least one matrix code;
wherein the at least one processing unit initiates an electronic device user support request based on the decoded information specific to the television receiver and the electronic device support information.

16. The system of claim 15, further comprising at least one user support provider wherein the at least one reader device initiates the electronic device user support request by transmitting the information specific to the television receiver to the at least one user support provider based on the electronic device support information.

17. The system of claim 16, wherein the at least one user support provider transmits a user support response to a user of the electronic device in response to receiving the information specific to the television receiver from the at least one reader device.

18. The system of claim 17, wherein the user support response includes scheduling information regarding a service call for the user support provider to provide user support for the electronic device.

19. The system of claim 15, wherein the information specific to the television receiver includes at least one encoded password related to usage of the electronic device and the electronic device support information includes information for recovering the at least one encoded password.

* * * * *